US010764727B2

(12) United States Patent
Chai

(10) Patent No.: US 10,764,727 B2
(45) Date of Patent: Sep. 1, 2020

(54) METHOD FOR CHARGING INTER-PLMN ROAMING DATA SERVICE ONLINE, AND DEVICE

(71) Applicant: Huawei Technologies Co., Ltd., Shenzhen (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/205,698

(22) Filed: Nov. 30, 2018

(65) Prior Publication Data

US 2019/0098463 A1 Mar. 28, 2019

Related U.S. Application Data

(63) Continuation of application No. 15/450,152, filed on Mar. 6, 2017, now Pat. No. 10,182,322, which is a
(Continued)

(30) Foreign Application Priority Data

Sep. 5, 2014 (CN) .......................... 2014 1 0453620

(51) Int. Cl.
*H04W 4/24* (2018.01)
*H04L 12/14* (2006.01)
(Continued)

(52) U.S. Cl.
CPC ............... *H04W 4/24* (2013.01); *H04L 12/14* (2013.01); *H04L 12/1403* (2013.01);
(Continued)

(58) Field of Classification Search
None
See application file for complete search history.

(56) References Cited

U.S. PATENT DOCUMENTS

2009/0172782 A1 7/2009 Taglienti et al.
2009/0264096 A1 10/2009 Cai et al.
(Continued)

FOREIGN PATENT DOCUMENTS

CN 101047988 A 10/2007
CN 101521868 A 9/2009
(Continued)

OTHER PUBLICATIONS

Machine Translation and Abstract of Chinese Publication No. CN103856925, Jun. 11, 2014, 16 pages.
(Continued)

*Primary Examiner* — Mazda Sabouri
(74) *Attorney, Agent, or Firm* — Conley Rose, P.C.

(57) ABSTRACT

A method for charging an inter-Public Land Mobile Network (PLMN) roaming data service online, and a device are presented. The method includes, after determining that an access subscriber is a roaming subscriber, establishing, by a visited-place packet data network gateway, an online charging session for the access subscriber; determining a first charging information parameter list; sending, to a home online charging system, a first quota request message carrying a rating group; receiving a roaming data service quota of the rating group sent by the home online charging system; and sending first charging information to the home online charging system according to the first charging information parameter list. The disclosed embodiments can simplify a network connection between a visited-place Packet Data Network Gateways (PGW) and an Online Charging System (OCS) of another operator that has a roaming agreement with the visited-place operator, reduce network connection complexity, and improve network connection efficiency.

20 Claims, 10 Drawing Sheets

Related U.S. Application Data continuation of application No. PCT/CN2015/086528, filed on Aug. 10, 2015.

(51) Int. Cl.
*H04M 15/00* (2006.01)
*H04W 8/02* (2009.01)

(52) U.S. Cl.
CPC ........... *H04M 15/49* (2013.01); *H04M 15/55* (2013.01); *H04M 15/64* (2013.01); *H04M 15/8038* (2013.01); *H04M 15/8214* (2013.01); *H04W 8/02* (2013.01); *H04M 15/50* (2013.01)

(56) References Cited

U.S. PATENT DOCUMENTS

| | | |
|---|---|---|
| 2009/0264097 A1 | 10/2009 | Cai et al. |
| 2009/0327112 A1 | 12/2009 | Li et al. |
| 2010/0180319 A1 | 7/2010 | Hu et al. |
| 2011/0066530 A1 | 3/2011 | Cai et al. |
| 2012/0129488 A1 | 5/2012 | Patterson et al. |
| 2013/0176908 A1 | 7/2013 | Baniel et al. |
| 2015/0131488 A1 | 5/2015 | Perez Martinez et al. |
| 2017/0201850 A1 | 7/2017 | Raleigh et al. |

FOREIGN PATENT DOCUMENTS

| | | |
|---|---|---|
| CN | 102026136 A | 4/2011 |
| CN | 102438201 A | 5/2012 |
| CN | 102511145 A | 6/2012 |
| CN | 103686655 A | 3/2014 |
| CN | 103856925 A | 6/2014 |
| CN | 103888926 A | 6/2014 |
| CN | 103929725 A | 7/2014 |
| CN | 104270734 A | 1/2015 |
| EP | 2547049 B1 | 9/2018 |
| WO | 2011026385 A1 | 3/2011 |
| WO | 2014094488 A1 | 6/2014 |

OTHER PUBLICATIONS

Machine Translation and Abstract of Chinese Publication No. CN103929725, Jul. 16, 2014, 19 pages.
Machine Translation and Abstract of Chinese Publication No. CN102026136, Apr. 20, 2011, 12 pages.
Machine Translation and Abstract of Chinese Publication No. CN103888926, Jun. 25, 2014, 30 pages.
Machine Translation and Abstract of Chinese Publication No. CN104270734, Jan. 7, 2015, 52 pages.
Machine Translation and Abstract of International Publication No. WO2011026385, Mar. 10, 2011, 10 pages.
Machine Translation and Abstract of International Publication No. WO2014094488, Jun. 26, 2014, 19 pages.
"3rd Generation Partnership Project;Technical Specification Group Services and System Aspects; Telecommunication management; Charging management; Packet Switched (PS) domain charging(Release 12)," 3GPP TS 32.251 V12.6.1 Jul. 2014, 155 pages.
"3rd Generation Partnership Project;Technical Specification Group Services and System Aspects; Telecommunication management;Charging management; Study on Inter-PLMN PS domain online charging; (Release 13)," 3GPP TR 32.843 0.1.0, May 2014, 10 pages.
Calhoun, P., et al., "Diameter Base Protocol," RFC 3588, Sep. 2003, 147 pages.
Fajardo, V., et al., "Diameter Base Protocol," RFC 6733, Oct. 2012, 152 pages.
"3rd Generation Partnership Project; Technical Specification Group Services and System Aspects; Telecommunication Management; Charging Management; Study on Inter-PLMN PS domain online charging: (release 13)", 3GPP TR 32.843 0.2.0, XP050842222, Aug. 2014, 20 pages.
Foreign Communication From a Counterpart Application, European Application No. 15838206.9, Extended European Search Report dated Jul. 27, 2017, 12 pages.
Foreign Communication From a Counterpart Application, Chinese Application No. 201410453620.0, Chinese Office Action dated Apr. 5, 2017, 7 pages.
Foreign Communication From a Counterpart Application, Chinese Application No. 201410453620.0, Chinese Search Report dated Mar. 27, 2017, 2 pages.
Foreign Communication From a Counterpart Application, PCT Application No. PCT/CN2015/086528, English Translation of International Search Report dated Nov. 6, 2015, 2 pages.
Foreign Communication From a Counterpart Application, PCT Application No. PCT/CN2015/086528, English Translation of Written Opinion dated Nov. 10, 2015, 7 pages.

METHOD FOR CHARGING INTER-PLMN ROAMING DATA SERVICE ONLINE, AND DEVICE

CROSS-REFERENCE TO RELATED APPLICATIONS

This application is a continuation of U.S. patent application Ser. No. 15/450,152, filed on Mar. 6, 2017, which is a continuation of International Application No. PCT/CN2015/086528, filed on Aug. 10, 2015. The International Application claims priority to Chinese Patent Application No. 201410453620.0, filed on Sep. 5, 2014. All of the aforementioned patent applications are hereby incorporated by reference in their entireties.

TECHNICAL FIELD

The present disclosure relates to the field of mobile communications technologies, and specifically, to a method for charging an inter-Public Land Mobile Network (PLMN) roaming data service online, and a device.

BACKGROUND

As mobile communications technologies are developed rapidly, subscribers have increasing requirements for accessing data services when the subscribers are in a roaming status, and it is particularly important for home operators to control consumption statuses of roaming (roam-out) subscribers online.

In an existing Policy and Charging Control (PCC) roaming architecture, an inter PLMN consumption status of a subscriber is controlled online using a Gy interface. That is, all visited-place Packet Data Network Gateways (PGWs) need to establish, using a Gy interface, a connection to an Online Charging System (OCS) of another operator that has a roaming agreement with the visited-place operator. There are a large quantity of visited-place PGWs and OCSs of operators that have a roaming agreement with the visited-place operator, causing a problem that a network connection is complex and inefficient. In addition, a Gy interface of a visited-place PGW needs to be open, making it difficult to protect visited-place network topology security.

SUMMARY

Embodiments of the present disclosure disclose a method for charging an inter-PLMN roaming data service online, and a device, so as to simplify a network connection between a visited-place PGW and an OCS of another operator that has a roaming agreement with the visited-place operator, reduce network connection complexity, and improve network connection efficiency.

A first aspect of the embodiments of the present disclosure discloses a method for charging an inter-PLMN roaming data service online, including determining, by a visited-place packet data network gateway, whether an access subscriber is a roaming subscriber; if the access subscriber is a roaming subscriber, establishing, by the visited-place packet data network gateway, an online charging session between the visited-place packet data network gateway and a home online charging system of the access subscriber for the access subscriber; determining, by the visited-place packet data network gateway, a first charging information parameter list according to the online charging session; sending, to the home online charging system by the visited-place packet data network gateway, a first quota request message that carries a rating group, to request the home online charging system to return, according to the rating group, a roaming data service quota authorized by the home online charging system; receiving, by the visited-place packet data network gateway, the roaming data service quota; and sending, by the visited-place packet data network gateway, first charging information to the home online charging system according to the first charging information parameter list, where the first charging information includes a usage of the roaming data service quota.

In a first possible implementation manner of the first aspect of the embodiments of the present disclosure, the determining, by the visited-place packet data network gateway, whether an access subscriber is a roaming subscriber includes determining, by the visited-place packet data network gateway, whether a home public land mobile network identifier of the access subscriber is the same as a public land mobile network identifier of the visited-place packet data network gateway, where if the home public land mobile network identifier of the access subscriber is different from the public land mobile network identifier of the visited packet data network gateway, the access subscriber is a roaming subscriber, or if the home public land mobile network identifier of the access subscriber is the same as the public land mobile network identifier of the visited packet data network gateway, the access subscriber is not a roaming subscriber.

With reference to the first aspect of the embodiments of the present disclosure or the first possible implementation manner of the first aspect of the embodiments of the present disclosure, in a second possible implementation manner of the first aspect of the embodiments of the present disclosure, the establishing, by the visited-place packet data network gateway, an online charging session between the visited-place packet data network gateway and a home online charging system of the access subscriber for the access subscriber includes sending, by the visited-place packet data network gateway, to a home online charging system that corresponds to an address of the home online charging system that is included in a policy and charging control PCC rule or a charging feature, a first request message that is used to establish the online charging session, where the PCC rule includes a PCC rule sent by a visited-place policy and charging rules function to the visited-place packet data network gateway, and the charging feature includes a charging feature configured by default on a visited-place public land mobile network of the access subscriber; and receiving, by the visited-place packet data network gateway, an online charging session response message that is sent by the home online charging system, and establishing the online charging session between the visited-place packet data network gateway and the home online charging system for the access subscriber, where the online charging session is established when an Internet Protocol-connectivity access network (IP-CAN) session is established, and is interrupted when the IP-CAN session is interrupted.

With reference to the first aspect of the embodiments of the present disclosure or the first possible implementation manner of the first aspect of the embodiments of the present disclosure, in a third possible implementation manner of the first aspect of the embodiments of the present disclosure, the establishing, by the visited-place packet data network gateway, an online charging session between the visited-place packet data network gateway and a home online charging system of the access subscriber for the access subscriber includes sending, by the visited-place packet data network gateway, to a proxy online charging system, a second request message that is used to establish a first charging session between the visited-place packet data network gateway and the proxy online charging system, where the proxy online charging system is a visited-place proxy online charging system of the access subscriber; and receiving, by the visited-place packet data network gateway, a first charging session response message sent by the proxy online charging system, and establishing the first charging session for the access subscriber, where the first charging session is established when an IP-CAN session is established, and is interrupted when the IP-CAN session is interrupted, or the first charging session is established when an IP-CAN bearer is established, and is interrupted when the IP-CAN bearer is interrupted, where the second request message is further used to trigger the proxy online charging system to determine whether a second charging session corresponding to the first charging session exists between the proxy online charging system and the determined home online charging system; and if a determining result indicates no, the proxy online charging system establishes a second charging session; or if a determining result indicates yes, the proxy online charging system stores a correspondence between the first charging session and a second charging session.

With reference to the third possible implementation manner of the first aspect of the embodiments of the present disclosure, in a fourth possible implementation manner of the first aspect of the embodiments of the present disclosure, the online charging session includes the first charging session and the second charging session; or the online charging session includes the first charging session, the second charging session, and at least one another charging session, where the at least one another charging session is a session, in addition to the first charging session, that is between the visited-place packet data network gateway and the proxy online charging system and that has a correspondence with the second charging session.

With reference to the second or the third possible implementation manner of the first aspect of the embodiments of the present disclosure, in a fifth possible implementation manner of the first aspect of the embodiments of the present disclosure, the determining, by the visited-place packet data network gateway, a first charging information parameter list according to the online charging session includes determining, by the visited-place packet data network gateway, whether the online charging session is an inter-PLMN online charging session; and if a determining result indicates yes, forming, by the visited-place packet data network gateway, the first charging information parameter list using a preconfigured charging information parameter applicable to a roaming subscriber; or if a determining result indicates no, forming, by the visited-place packet data network gateway, the first charging information parameter list using a preconfigured charging information parameter applicable to a non-roaming subscriber.

With reference to the third possible implementation manner of the first aspect of the embodiments of the present disclosure, in a sixth possible implementation manner of the first aspect of the embodiments of the present disclosure, the sending, to the home online charging system by the visited-place packet data network gateway, a first quota request message that carries a rating group, to request the home online charging system to return, according to the rating group, a roaming data service quota authorized by the home online charging system includes sending, to the proxy online charging system by the visited-place packet data network gateway, the first quota request message that carries the rating group, to trigger the proxy online charging system to determine whether the roaming data service quota of the rating group exists in the proxy online charging system, where if a determining result indicates yes, the proxy online charging system sends the roaming data service quota to the visited-place packet data network gateway, or if a determining result indicates no, the proxy online charging system sends, to the home online charging system, a second quota request message that carries the rating group, to request the home online charging system to send, to the proxy online charging system according to the rating group, the roaming data service quota authorized by the home online charging system.

With reference to the third or the fifth possible implementation manner of the first aspect of the embodiments of the present disclosure, in a seventh possible implementation manner of the first aspect of the embodiments of the present disclosure, the sending, by the visited-place packet data network gateway, first charging information to the home online charging system according to the first charging information parameter list includes sending, by the visited-place packet data network gateway, the first charging information to the proxy online charging system according to the first charging information parameter list, so that the proxy online charging system generates second charging information according to the first charging information and sends the second charging information to the home online charging system.

With reference to the third possible implementation manner of the first aspect of the embodiments of the present disclosure, in an eighth possible implementation manner of the first aspect of the embodiments of the present disclosure, the method further includes sending, by the visited-place packet data network gateway, a third request message that is used to interrupt the first charging session to the proxy online charging system; and receiving, by the visited-place packet data network gateway, a first charging session interruption response message that is sent by the proxy online charging system, to interrupt the first charging session, where the third request message is further used to trigger the proxy online charging system to determine whether the first charging session is a last charging session that has a correspondence with the second charging session, and if a determining result indicates yes, the proxy online charging system interrupts the second charging session.

With reference to the third possible implementation manner of the first aspect of the embodiments of the present disclosure, in a ninth possible implementation manner of the first aspect of the embodiments of the present disclosure, the second request message includes an address of the home online charging system, and the address is used by the proxy online charging system to determine the home online charging system according to the address.

With reference to any one of the first aspect of the embodiments of the present disclosure, the first possible implementation manner of the first aspect of the embodiments of the present disclosure, the second possible implementation manner of the first aspect of the embodiments of the present disclosure, or the third possible implementation manner of the first aspect of the embodiments of the present disclosure, in a tenth possible implementation manner of the first aspect of the embodiments of the present disclosure, if the access subscriber is a roaming subscriber, before the establishing, by the visited-place packet data network gateway, an online charging session between the visited-place packet data network gateway and a home online charging system of the access subscriber for the access subscriber, the method further includes determining, by the visited-place packet data network gateway, whether a current service bearer corresponding to the access subscriber is an emergency service bearer; and if yes, skipping, by the visited-place packet data network gateway, performing the step of establishing, by the visited-place packet data network gateway, an online charging session between the visited-place packet data network gateway and a home online charging system of the access subscriber for the access subscriber; or if no, performing, by the visited-place packet data network gateway, the step of establishing, by the visited-place packet data network gateway, an online charging session between the visited-place packet data network gateway and a home online charging system of the access subscriber for the access subscriber.

With reference to the first aspect of the embodiments of the present disclosure, in an eleventh possible implementation manner of the first aspect of the embodiments of the present disclosure, the method further includes collecting, by the visited-place packet data network gateway, offline charging information, and sending the offline charging information to an offline charging system, where the offline charging system is a visited-place offline charging system of the access subscriber, the offline charging information includes indication information, and the indication information is used to indicate that the online charging session exists in a visited place of the access subscriber.

A second aspect of the embodiments of the present disclosure discloses a method for charging an inter-PLMN roaming data service online, including receiving, by a proxy online charging system, a first request message that is sent by a visited-place packet data network gateway and that is used to establish an online charging session between the visited-place packet data network gateway and a determined home online charging system of an access subscriber for the access subscriber, where the access subscriber is a roaming subscriber; establishing, by the proxy online charging system, the online charging session in response to the first request message; receiving, by the proxy online charging system, a first quota request message that is sent by the visited-place packet data network gateway and that carries a rating group; sending, by the proxy online charging system to the visited-place packet data network gateway in response to the first quota request message, a first roaming data service quota of the rating group that is authorized by the home online charging system; determining, by the proxy online charging system, a usage of the first roaming data service quota; and sending, by the proxy online charging system, charging information that includes the usage to the home online charging system.

In a first possible implementation manner of the second aspect of the embodiments of the present disclosure, the establishing, by the proxy online charging system, the online charging session in response to the first request message includes establishing, by the proxy online charging system, a first charging session between the proxy online charging system and the visited-place packet data network gateway, where the first charging session is established when an IP-CAN session is established, and is interrupted when the IP-CAN session is interrupted, or the first charging session is established when an IP-CAN bearer is established, and is interrupted when the IP-CAN bearer is interrupted; determining, by the proxy online charging system according to the first request message, whether a second charging session corresponding to the first charging session exists between the proxy online charging system and the home online charging system; and if a determining result indicates no, establishing, by the proxy online charging system, a second charging session; or if a determining result indicates yes, storing, by the proxy online charging system, a correspondence between the first charging session and a second charging session; and responding, by the proxy online charging system, to the first request message.

With reference to the first possible implementation manner of the second aspect of the embodiments of the present disclosure, in a second possible implementation manner of the second aspect of the embodiments of the present disclosure, the online charging session includes the first charging session and the second charging session; or the online charging session includes the first charging session, the second charging session, and at least one another charging session, where the at least one another charging session is a session, in addition to the first charging session, that is between the visited-place packet data network gateway and the proxy online charging system and that has a correspondence with the second charging session.

With reference to the second aspect of the embodiments of the present disclosure, in a third possible implementation manner of the second aspect of the embodiments of the present disclosure, before the sending, by the proxy online charging system, charging information that includes the usage to the home online charging system, the method further includes reducing, by the proxy online charging system according to a preconfigured charging information parameter applicable to a roaming subscriber, charging information that is received from the visited-place packet data network gateway, to generate the charging information that is sent to the home online charging system and that includes the usage.

With reference to the second or the third possible implementation manner of the second aspect of the embodiments of the present disclosure, in a fourth possible implementation manner of the second aspect of the embodiments of the present disclosure, the sending, by the proxy online charging system to the visited-place packet data network gateway in response to the first quota request message, a first roaming data service quota of the rating group that is authorized by the home online charging system includes determining, by the proxy online charging system, whether the first roaming data service quota of the rating group exists in the proxy online charging system; and if a determining result indicates yes, sending, by the proxy online charging system, the first roaming data service quota to the visited-place packet data network gateway; or if a determining result indicates no, sending, to the home online charging system by the proxy online charging system, a second quota request message that carries the rating group, to request the home online charging system to send, to the proxy online charging system according to the rating group, the first roaming data service quota authorized by the home online charging system; receiving, by the proxy online charging system, the first roaming data service quota; and sending, by the proxy online charging system, the first roaming data service quota to the visited-place packet data network gateway.

With reference to the second or the third possible implementation manner of the second aspect of the embodiments of the present disclosure, in a fifth possible implementation manner of the second aspect of the embodiments of the present disclosure, the sending, by the proxy online charging system to the visited-place packet data network gateway in response to the first quota request message, a first roaming data service quota of the rating group that is authorized by the home online charging system includes determining, by the proxy online charging system, a first-type target charging session, which uses the roaming data service quota of the rating group, of multiple charging sessions, which correspond to the second charging session, between the proxy online charging system and the visited-place packet data network gateway, where the multiple charging sessions include the first charging session and the at least one another charging session; obtaining, by the proxy online charging system, a quota request message of each charging session of the first-type target charging session, and gathering a roaming data service quota of each charging session of the first-type target charging session to obtain a second roaming data service quota; sending, by the proxy online charging system, a second request message that is used to obtain the second roaming data service quota to the home online charging system, to request the home online charging system to send, to the proxy online charging system, a third roaming data service quota of the rating group that is authorized by the home online charging system; receiving, by the proxy online charging system, the third roaming data service quota, and allocating the first roaming data service quota from the third roaming data service quota; and sending, by the proxy online charging system, the first roaming data service quota to the visited-place packet data network gateway.

With reference to the second or the third possible implementation manner of the second aspect of the embodiments of the present disclosure, in a sixth possible implementation manner of the second aspect of the embodiments of the present disclosure, the sending, by the proxy online charging system to the visited-place packet data network gateway in response to the first quota request message, a first roaming data service quota of the rating group that is authorized by the home online charging system includes determining, by the proxy online charging system, a second-type target charging session, which uses the roaming data service quota of the rating group, of multiple charging sessions, which correspond to the second charging session, between the proxy online charging system and the visited-place packet data network gateway, where the multiple charging sessions include the first charging session and the at least one another charging session; obtaining, by the proxy online charging system, a usage of a roaming data service quota of each charging session of the second-type target charging session, to calculate a remaining roaming data service quota of each charging session of the second-type target charging session, and gathering the remaining roaming data service quota of each charging session of the second-type target charging session to obtain a fourth roaming data service quota; and allocating, by the proxy online charging system, the first roaming data service quota from the fourth roaming data service quota, and sending the first roaming data service quota to the visited-place packet data network gateway.

With reference to the second possible implementation manner of the second aspect of the embodiments of the present disclosure, in a seventh possible implementation manner of the second aspect of the embodiments of the present disclosure, the method further includes receiving, by the proxy online charging system, a third request message that is sent by the visited-place packet data network gateway and that is used to interrupt the online charging session; and interrupting, by the proxy online charging system, the online charging session in response to the third request message, where the interrupting, by the proxy online charging system, the online charging session in response to the third request message includes interrupting, by the proxy online charging system, the first charging session; determining, by the proxy online charging system, whether the first charging session is a last charging session that has a correspondence with the second charging session; and if a determining result indicates yes, interrupting, by the proxy online charging system, the second charging session.

With reference to the second aspect of the embodiments of the present disclosure, in an eighth possible implementation manner of the second aspect of the embodiments of the present disclosure, the first request message includes an address of the home online charging system, and the address is used by the proxy online charging system to determine the home online charging system according to the address.

A third aspect of the embodiments of the present disclosure discloses a packet data network gateway, including a judging module configured to determine whether an access subscriber is a roaming subscriber; an establishment module configured to, when the judging module determines that the access subscriber is a roaming subscriber, establish an online charging session between the packet data network gateway and a home online charging system of the access subscriber for the access subscriber; a determining module configured to determine a first charging information parameter list according to the online charging session; an output module configured to send, to the home online charging system, a first quota request message that carries a rating group, to request the home online charging system to return, according to the rating group, a roaming data service quota authorized by the home online charging system; and an input module configured to receive the roaming data service quota, where the output module is further configured to send first charging information to the home online charging system according to the first charging information parameter list, where the first charging information includes a usage of the roaming data service quota.

In a first possible implementation manner of the third aspect of the embodiments of the present disclosure, the judging module determines whether the access subscriber is a roaming subscriber in the following specific manner: determining whether a home public land mobile network identifier of the access subscriber is the same as a public land mobile network identifier of the packet data network gateway, where if the home public land mobile network identifier of the access subscriber is different from the public land mobile network identifier of the visited packet data network gateway, the access subscriber is a roaming subscriber, or if the home public land mobile network identifier of the access subscriber is the same as the public land mobile network identifier of the visited packet data network gateway, the access subscriber is not a roaming subscriber.

With reference to the third aspect of the embodiments of the present disclosure or the first possible implementation manner of the third aspect of the embodiments of the present disclosure, in a second possible implementation manner of the third aspect of the embodiments of the present disclosure, the establishment module includes a first output submodule configured to send, to a home online charging system that corresponds to an address of the home online charging system that is included in a PCC rule or a charging feature, a first request message that is used to establish the online charging session, where the PCC rule includes a PCC rule sent by a visited-place policy and charging rules function to the packet data network gateway, and the charging feature includes a charging feature configured by default on a visited-place public land mobile network of the access subscriber; and a first input submodule configured to receive an online charging session response message that is sent by the home online charging system, and establish the online charging session between the packet data network gateway and the home online charging system for the access subscriber, where the online charging session is established when an IP-CAN session is established, and is interrupted when the IP-CAN session is interrupted.

With reference to the third aspect of the embodiments of the present disclosure or the first possible implementation manner of the third aspect of the embodiments of the present disclosure, in a third possible implementation manner of the third aspect of the embodiments of the present disclosure, the establishment module includes a second output submodule configured to send, to a proxy online charging system, a second request message that is used to establish a first charging session between the packet data network gateway and the proxy online charging system, where the proxy online charging system is a visited-place proxy online charging system of the access subscriber; and a second input submodule configured to receive a first charging session response message sent by the proxy online charging system, and establish the first charging session for the access subscriber, where the first charging session is established when an IP-CAN session is established, and is interrupted when the IP-CAN session is interrupted, or the first charging session is established when an IP-CAN bearer is established, and is interrupted when the IP-CAN bearer is interrupted, where the second request message is further used to trigger the proxy online charging system to determine whether a second charging session corresponding to the first charging session exists between the proxy online charging system and the determined home online charging system; and if a determining result indicates no, the proxy online charging system establishes a second charging session; or if a determining result indicates yes, the proxy online charging system stores a correspondence between the first charging session and a second charging session.

With reference to the third possible implementation manner of the third aspect of the embodiments of the present disclosure, in a fourth possible implementation manner of the third aspect of the embodiments of the present disclosure, the online charging session includes the first charging session and the second charging session; or the online charging session includes the first charging session, the second charging session, and at least one another charging session, where the at least one another charging session is a session, in addition to the first charging session, that is between the packet data network gateway and the proxy online charging system and that has a correspondence with the second charging session.

With reference to the second or the third possible implementation manner of the third aspect of the embodiments of the present disclosure, in a fifth possible implementation manner of the third aspect of the embodiments of the present disclosure, the determining module determines the first charging information parameter list according to the online charging session in the following specific manner: determining whether the online charging session is an inter-PLMN online charging session; and if a determining result indicates yes, forming the first charging information parameter list using a preconfigured charging information parameter applicable to a roaming subscriber; or if a determining result indicates no, forming the first charging information parameter list using a preconfigured charging information parameter applicable to a non-roaming subscriber.

With reference to the third possible implementation manner of the third aspect of the embodiments of the present disclosure, in a sixth possible implementation manner of the third aspect of the embodiments of the present disclosure, the output module sends, to the home online charging system, the first quota request message that carries the rating group, to request the home online charging system to return, according to the rating group, the roaming data service quota authorized by the home online charging system in the following specific manner: sending, to the proxy online charging system, the first quota request message that carries the rating group, to trigger the proxy online charging system to determine whether the roaming data service quota of the rating group exists in the proxy online charging system, where if a determining result indicates yes, the proxy online charging system sends the roaming data service quota to the packet data network gateway, or if a determining result indicates no, the proxy online charging system sends, to the home online charging system, a second quota request message that carries the rating group, to request the home online charging system to send, to the proxy online charging system according to the rating group, the roaming data service quota authorized by the home online charging system.

With reference to the third or the fifth possible implementation manner of the third aspect of the embodiments of the present disclosure, in a seventh possible implementation manner of the third aspect of the embodiments of the present disclosure, the output module sends the first charging information to the home online charging system according to the first charging information parameter list in the following specific manner: sending the first charging information to the proxy online charging system according to the first charging information parameter list, so that the proxy online charging system generates second charging information according to the first charging information and sends the second charging information to the home online charging system.

With reference to the third possible implementation manner of the third aspect of the embodiments of the present disclosure, in an eighth possible implementation manner of the third aspect of the embodiments of the present disclosure, the output module is further configured to send a third request message that is used to interrupt the first charging session to the proxy online charging system; and the input module is further configured to receive a first charging session interruption response message that is sent by the proxy online charging system, to interrupt the first charging session, where the third request message is further used to trigger the proxy online charging system to determine whether the first charging session is a last charging session that has a correspondence with the second charging session, and if a determining result indicates yes, the proxy online charging system interrupts the second charging session.

With reference to the third possible implementation manner of the third aspect of the embodiments of the present disclosure, in a ninth possible implementation manner of the third aspect of the embodiments of the present disclosure, the second request message includes an address of the home online charging system, and the address is used by the proxy online charging system to determine the home online charging system according to the address.

With reference to any one of the third aspect of the embodiments of the present disclosure, the first possible implementation manner of the third aspect of the embodiments of the present disclosure, the second possible implementation manner of the third aspect of the embodiments of the present disclosure, or the third possible implementation manner of the third aspect of the embodiments of the present disclosure, in a tenth possible implementation manner of the third aspect of the embodiments of the present disclosure, the judging module is further configured to, when the access subscriber is a roaming subscriber, and before the establishment module establishes the online charging session between the packet data network gateway and the home online charging system of the access subscriber for the access subscriber, determine whether a current service bearer corresponding to the access subscriber is an emergency service bearer; and if yes, the establishment module does not establish the online charging session between the packet data network gateway and the home online charging system of the access subscriber for the access subscriber; or if no, the establishment module establishes the online charging session between the packet data network gateway and the home online charging system of the access subscriber for the access subscriber.

With reference to the third aspect of the embodiments of the present disclosure, in an eleventh possible implementation manner of the third aspect of the embodiments of the present disclosure, the packet data network gateway further includes a collection module configured to collect offline charging information; and the output module is further configured to send the offline charging information to an offline charging system, where the offline charging system is a visited-place offline charging system of the access subscriber, the offline charging information includes indication information, and the indication information is used to indicate that the online charging session exists in a visited place of the access subscriber.

A fourth aspect of the embodiments of the present disclosure discloses a proxy online charging system, including an input module configured to receive a first request message that is sent by a visited-place packet data network gateway and that is used to establish an online charging session between the visited-place packet data network gateway and a determined home online charging system of an access subscriber for the access subscriber, where the access subscriber is a roaming subscriber; an establishment module configured to establish the online charging session in response to the first request message, where the input module is further configured to receive a first quota request message that is sent by the visited-place packet data network gateway and that carries a rating group; a first output module configured to send, to the visited-place packet data network gateway in response to the first quota request message, a first roaming data service quota of the rating group that is authorized by the home online charging system; a determining module configured to determine a usage of the first roaming data service quota; and a second output module configured to send charging information that includes the usage to the home online charging system.

In a first possible implementation manner of the fourth aspect of the embodiments of the present disclosure, the establishment module includes a first establishment submodule configured to establish a first charging session between the proxy online charging system and the visited-place packet data network gateway, where the first charging session is established when an IP-CAN session is established, and is interrupted when the IP-CAN session is interrupted, or the first charging session is established when an IP-CAN bearer is established, and is interrupted when the IP-CAN bearer is interrupted; a first judging submodule configured to determine, according to the first request message, whether a second charging session corresponding to the first charging session exists between the proxy online charging system and the home online charging system; a second establishment submodule configured to, when a determining result of the first judging submodule indicates no, establish a second charging session; and a storage submodule configured to, when a determining result of the first judging submodule indicates yes, store a correspondence between the first charging session and a second charging session.

With reference to the first possible implementation manner of the fourth aspect of the embodiments of the present disclosure, in a second possible implementation manner of the fourth aspect of the embodiments of the present disclosure, the online charging session includes the first charging session and the second charging session; or the online charging session includes the first charging session, the second charging session, and at least one another charging session, where the at least one another charging session is a session, in addition to the first charging session, that is between the visited-place packet data network gateway and the proxy online charging system and that has a correspondence with the second charging session.

With reference to the fourth aspect of the embodiments of the present disclosure, in a third possible implementation manner of the fourth aspect of the embodiments of the present disclosure, the proxy online charging system further includes a reduction module configured to, before the second output module sends the charging information that includes the usage to the home online charging system, reduce, according to a preconfigured charging information parameter applicable to a roaming subscriber, charging information that is received from the visited-place packet data network gateway, to generate the charging information that is sent to the home online charging system and that includes the usage.

With reference to the second or the third possible implementation manner of the fourth aspect of the embodiments of the present disclosure, in a fourth possible implementation manner of the fourth aspect of the embodiments of the present disclosure, the first output module includes a second judging submodule configured to determine whether the first roaming data service quota of the rating group exists in the proxy online charging system; and a first output submodule configured to, when a determining result of the second judging submodule indicates yes, send the first roaming data service quota to the visited-place packet data network gateway; a second output submodule configured to, if a determining result of the second judging submodule indicates no, send, to the home online charging system, a second quota request message that carries the rating group, to request the home online charging system to send, to the proxy online charging system according to the rating group, the first roaming data service quota authorized by the home online charging system; and a first input submodule configured to receive the first roaming data service quota, where the first output submodule is further configured to send the first roaming data service quota to the visited-place packet data network gateway.

With reference to the second or the third possible implementation manner of the fourth aspect of the embodiments of the present disclosure, in a fifth possible implementation manner of the fourth aspect of the embodiments of the present disclosure, the first output module includes a first determining submodule configured to determine a first-type target charging session, which uses the roaming data service quota of the rating group, of multiple charging sessions, which correspond to the second charging session, between the proxy online charging system and the visited-place packet data network gateway, where the multiple charging sessions include the first charging session and the at least one another charging session; a first obtaining submodule configured to obtain a quota request message of each charging session of the first-type target charging session; a first gathering submodule configured to gather a roaming data service quota of each charging session of the first-type target charging session to obtain a second roaming data service quota; a third output submodule configured to send a second request message that is used to obtain the second roaming data service quota to the home online charging system, to request the home online charging system to send, to the proxy online charging system, a third roaming data service quota of the rating group that is authorized by the home online charging system; a second input submodule configured to receive the third roaming data service quota; a first allocation submodule configured to allocate the first roaming data service quota from the third roaming data service quota; and a fourth output submodule configured to send the first roaming data service quota to the visited-place packet data network gateway.

With reference to the second or the third possible implementation manner of the fourth aspect of the embodiments of the present disclosure, in a sixth possible implementation manner of the fourth aspect of the embodiments of the present disclosure, the first output module includes a second determining submodule configured to determine a second-type target charging session, which uses the roaming data service quota of the rating group, of multiple charging sessions, which correspond to the second charging session, between the proxy online charging system and the visited-place packet data network gateway, where the multiple charging sessions include the first charging session and the at least one another charging session; a second obtaining submodule configured to obtain a usage of a roaming data service quota of each charging session of the second-type target charging session; a calculation submodule configured to calculate a remaining roaming data service quota of each charging session of the second-type target charging session; a second gathering submodule configured to gather the remaining roaming data service quota of each charging session of the second-type target charging session to obtain a fourth roaming data service quota; a second allocation submodule configured to allocate the first roaming data service quota from the fourth roaming data service quota; and a fifth output submodule configured to send the first roaming data service quota to the visited-place packet data network gateway.

With reference to the second possible implementation manner of the fourth aspect of the embodiments of the present disclosure, in a seventh possible implementation manner of the fourth aspect of the embodiments of the present disclosure, the input module is further configured to receive a third request message that is sent by the visited-place packet data network gateway and that is used to interrupt the online charging session; and the proxy online charging system further includes an interruption module configured to interrupt the online charging session in response to the third request message, where the interruption module includes an interruption submodule and a third judging submodule, where the interruption submodule is configured to interrupt the first charging session; the third judging submodule is configured to determine whether the first charging session is a last charging session that has a correspondence with the second charging session; and the interruption submodule is further configured to, when a determining result of the third judging submodule indicates yes, interrupt the second charging session.

With reference to the fourth aspect of the embodiments of the present disclosure, in an eighth possible implementation manner of the fourth aspect of the embodiments of the present disclosure, the first request message includes an address of the home online charging system, and the address is used by the proxy online charging system to determine the home online charging system according to the address.

According to the embodiments of the present disclosure, after determining that an access subscriber is a roaming subscriber, a visited-place packet data network gateway establishes an online charging session between the visited-place packet data network gateway and a home online charging system of the access subscriber for the access subscriber; determines a first charging information parameter list according to the online charging session; sends, to the home online charging system, a first quota request message that carries a rating group, to request the home online charging system to send, to the visited-place packet data network gateway according to the rating group, a roaming data service quota authorized by the home online charging system; receives the roaming data service quota; and sends first charging information to the home online charging system according to the first charging information parameter list when the access subscriber accesses a roaming data service, where the first charging information includes a usage of the roaming data service quota. Implementation of the embodiments of the present disclosure can simplify a network connection between a visited-place PGW and an OCS of another operator that has a roaming agreement with the visited-place operator, reduce network connection complexity, and improve network connection efficiency.

BRIEF DESCRIPTION OF DRAWINGS

To describe the technical solutions in the embodiments of the present disclosure or in the prior art more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
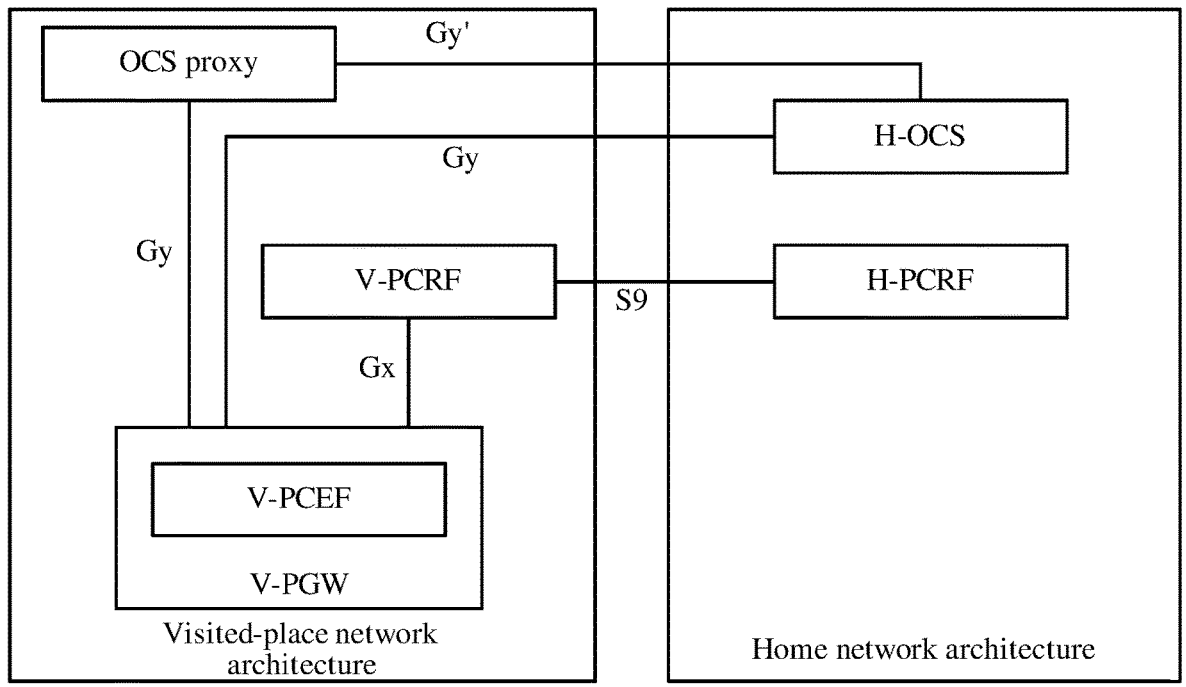
FIG. 1 is a schematic structural diagram of a PCC roaming architecture according to an embodiment of the present disclosure.

The embodiments of the present disclosure disclose a method for charging an inter-PLMN roaming data service online, and a device, so as to simplify a network connection between a visited-place PGW and an OCS of another operator that has a roaming agreement with the visited-place operator, reduce network connection complexity, and improve network connection efficiency. In addition, the method for charging an inter-PLMN roaming data service online is applicable to a PCC roaming architecture shown in FIG. 1. FIG. 1 is a schematic structural diagram of a PCC roaming architecture according to an embodiment of the present disclosure.

As shown in FIG. 1, the PCC roaming architecture may include a visited-place network architecture and a home network architecture. The visited-place network architecture may include a Visited Packet Data Network Gateway (V-PGW), a Visited Policy and Charging Enforcement Function (V-PCEF), a Visited Policy and Charging Rules Function (V-PCRF), and a proxy OCS. The home network architecture may include a Home Online Charging System (H-OCS) and a Home Policy and Charging Rules Function (H-PCRF). Moreover, Gx is an interface between the V-PCEF and the V-PCRF, and uses a Diameter protocol, Gy is an interface between the V-PCEF and the proxy OCS and an interface between the V-PCEF and the H-OCS, Gy' is an interface between the proxy OCS and the H-OCS, and S9 is an interface between the V-PCRF and the H-PCRF. The V-PCEF is a policy control functional entity in the V-PGW, and performs policy and charging functions of a visited place according to a PCC rule delivered by the V-PCRF. The V-PCRF formulates a corresponding PCC rule according to a visited-place service attribute, subscriber subscription information, and the like, and delivers the PCC rule to the V-PCEF. In addition, when an access subscriber is a roaming subscriber, the V-PCRF may further formulate, according to a home PCC rule obtained from the H-PCRF, a PCC rule that satisfies a roaming data service. The H-PCRF formulates a corresponding PCC rule according to a home service attribute, subscriber subscription information, and the like, and delivers the formulated PCC rule to an H-PCEF (not drawn in FIG. 1) for enforcement. In addition, when a subscriber is in a roaming status, the H-PCRF may further send the formulated PCC rule to the V-PCRF.

Figure 2:
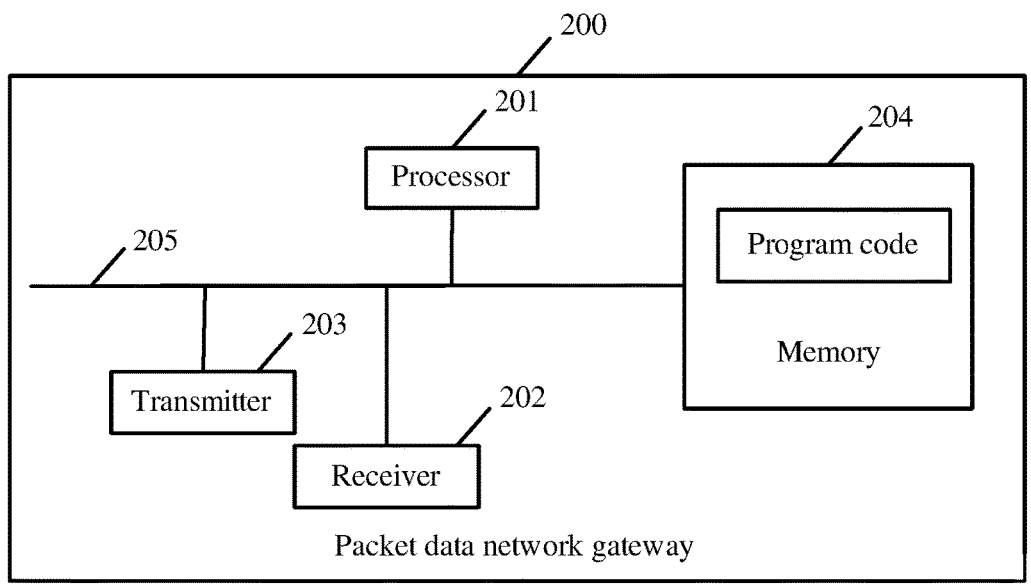
FIG. 2 is a schematic structural diagram of a packet data network gateway according to an embodiment of the present disclosure.

Referring to FIG. 2, FIG. 2 is a schematic structural diagram of a packet data network gateway according to an embodiment of the present disclosure. As shown in FIG. 2, the packet data network gateway 200 may include at least one processor 201 such as a central processing unit (CPU), a receiver 202, a transmitter 203, a memory 204, and at least one communications bus 205. The memory 204 may be a high-speed random access memory (RAM) memory, or may be a non-volatile memory (NVM) such as at least one magnetic disk storage. Optionally, the memory 204 may be at least one storage apparatus far away from the processor 201.

The communications bus 205 is configured to implement connection and communication between these components.

The processor 201 is configured to invoke program code stored in the memory 204, to perform the following operations: determining whether an access subscriber is a roaming subscriber; if the access subscriber is a roaming subscriber, establishing an online charging session between the packet data network gateway 200 and a home online charging system of the access subscriber for the access subscriber; and determining a first charging information parameter list according to the online charging session.

The transmitter 203 is configured to send, to the home online charging system, a first quota request message that carries a rating group, to request the home online charging system to send, to the packet data network gateway 200 according to the rating group, a roaming data service quota authorized by the home online charging system.

The receiver 202 is configured to receive the roaming data service quota.

The transmitter 203 is further configured to send first charging information to the home online charging system according to the first charging information parameter list. The first charging information includes a usage of the roaming data service quota.

In an optional implementation manner, the processor 201 may determine whether the access subscriber is a roaming subscriber in the following specific manner: determining whether a home public land mobile network identifier of the access subscriber is the same as a public land mobile network identifier of the packet data network gateway 200, where if no, the access subscriber is a roaming subscriber, or if yes, the access subscriber is not a roaming subscriber.

In an optional implementation manner, the processor 201 may establish an online charging session between the packet data network gateway 200 and a home online charging system of the access subscriber for the access subscriber in the following specific manner: sending, to a home online charging system that corresponds to an address of the home online charging system that is included in a PCC rule or a charging feature, a first request message that is used to establish the online charging session, where the PCC rule includes a PCC rule sent by a visited-place policy and charging rules function to the packet data network gateway 200, and the charging feature includes a charging feature configured by default on a visited-place public land mobile network of the access subscriber; and receiving an online charging session response message that is sent by the home online charging system, and establishing the online charging session between the packet data network gateway 200 and the home online charging system of the access subscriber for the access subscriber, where the online charging session is established when an IP-CAN session is established, and is interrupted when the IP-CAN session is interrupted.

In another optional implementation manner, the processor 201 may establish an online charging session between the packet data network gateway 200 and a home online charging system of the access subscriber for the access subscriber in the following specific manner: sending, to a proxy online charging system, a second request message that is used to establish a first charging session between the packet data network gateway 200 and the proxy online charging system, where the proxy online charging system is a visited-place proxy online charging system of the access subscriber, and the second request message may include an address of the home online charging system, so that the proxy online charging system determines the home online charging system according to the address; and receiving a first charging session response message sent by the proxy online charging system, and establishing the first charging session for the access subscriber, where the first charging session is established when an IP-CAN session is established, and is interrupted when the IP-CAN session is interrupted, or the first charging session is established when an IP-CAN bearer is established, and is interrupted when the IP-CAN bearer is interrupted.

The second request message is further used to trigger the proxy online charging system to determine whether a second charging session corresponding to the first charging session exists between the proxy online charging system and the determined home online charging system; and if a determining result indicates no, the proxy online charging system establishes a second charging session; or if a determining result indicates yes, the proxy online charging system stores a correspondence between the first charging session and a second charging session.

Implementation of this embodiment of the present disclosure can simplify a network connection between a visited-place PGW and an OCS of another operator that has a roaming agreement with the visited-place operator, reduce network connection complexity, and improve network connection efficiency and performance of controlling inter-PLMN subscriber consumption status online. In addition, use of a proxy online charging system to establish an online charging session can protect network topology security of a visited-place PLMN.

Figure 3:
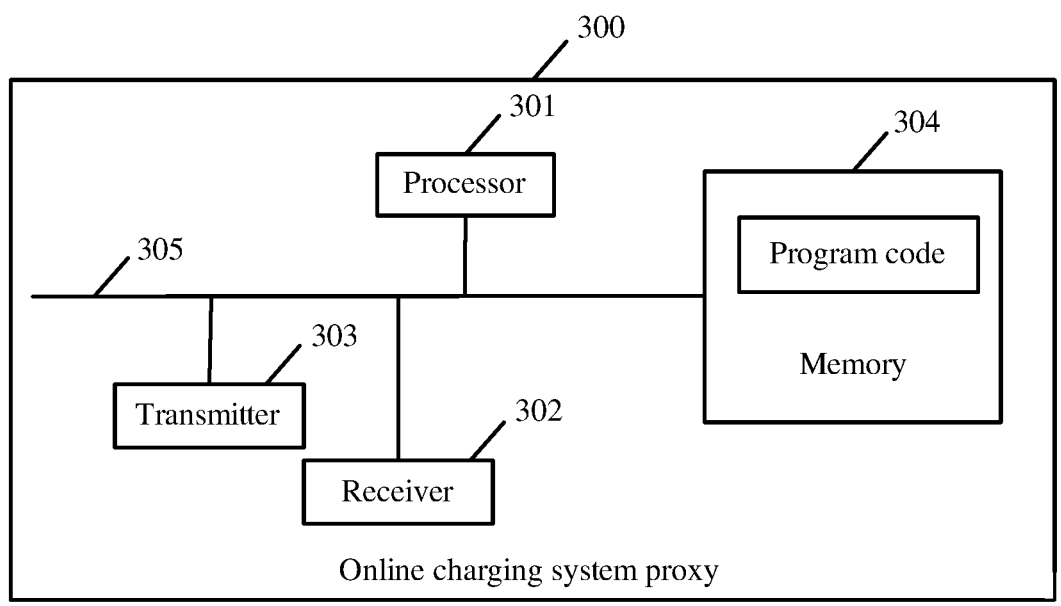
FIG. 3 is a schematic structural diagram of a proxy online charging system according to an embodiment of the present disclosure.

Referring to FIG. 3, FIG. 3 is a schematic structural diagram of a proxy online charging system according to an embodiment of the present disclosure. As shown in FIG. 3, the proxy online charging system 300 may include at least one processor 301 such as a CPU, a receiver 302, a transmitter 303, a memory 304, and at least one communications bus 305. The memory 304 may be a high-speed RAM memory, or may be a NVM such as at least one magnetic disk storage. Optionally, the memory 304 may be at least one storage apparatus far away from the processor 301.

The communications bus 305 is configured to implement connection and communication between these components.

The receiver 302 is configured to receive a first request message that is sent by a visited-place packet data network gateway and that is used to establish an online charging session between the visited-place packet data network gateway and a determined home online charging system of an access subscriber for the access subscriber. The access subscriber is a roaming subscriber. The first request message may include an address of the home online charging system, so that the proxy online charging system 300 determines the home online charging system according to the address.

The processor 301 is configured to invoke program code stored in the memory 304, to perform the following operation: establishing the online charging session in response to the first request message.

The receiver 302 is further configured to receive a first quota request message that is sent by the visited-place packet data network gateway and that carries a rating group.

The transmitter 303 is configured to send, to the visited-place packet data network gateway in response to the first quota request message, a first roaming data service quota of the rating group that is authorized by the home online charging system.

The processor 301 is configured to invoke program code stored in the memory 304, to further perform the following operation: determining a usage of the first roaming data service quota.

The transmitter 303 is further configured to send charging information that includes the usage to the home online charging system.

In an optional implementation manner, the processor 301 may establish the online charging session in response to the first request message in the following specific manner: establishing a first charging session between the proxy online charging system 300 and the visited-place packet data network gateway, where the first charging session is established when an IP-CAN session is established, and is interrupted when the IP-CAN session is interrupted, or the first charging session is established when an IP-CAN bearer is established, and is interrupted when the IP-CAN bearer is interrupted; and determining, according to the first request message, whether a second charging session corresponding to the first charging session exists between the proxy online charging system 300 and the home online charging system; and if a determining result indicates no, establishing a second charging session; or if a determining result indicates yes, storing a correspondence between the first charging session and a second charging session.

The online charging session may include the first charging session and the second charging session. Alternatively, the online charging session may include the first charging session, the second charging session, and at least one another charging session. The at least one another charging session is a session, in addition to the first charging session, that is between the visited-place packet data network gateway and the proxy online charging system 300 and that has a correspondence with the second charging session.

Implementation of this embodiment of the present disclosure can simplify a network connection between a visited-place PGW and an OCS of another operator that has a roaming agreement with the visited-place operator, reduce network connection complexity, and improve network connection efficiency and performance of controlling inter-PLMN subscriber consumption status online. In addition, use of a proxy online charging system to establish an online charging session can protect network topology security of a visited-place PLMN.

Figure 4:
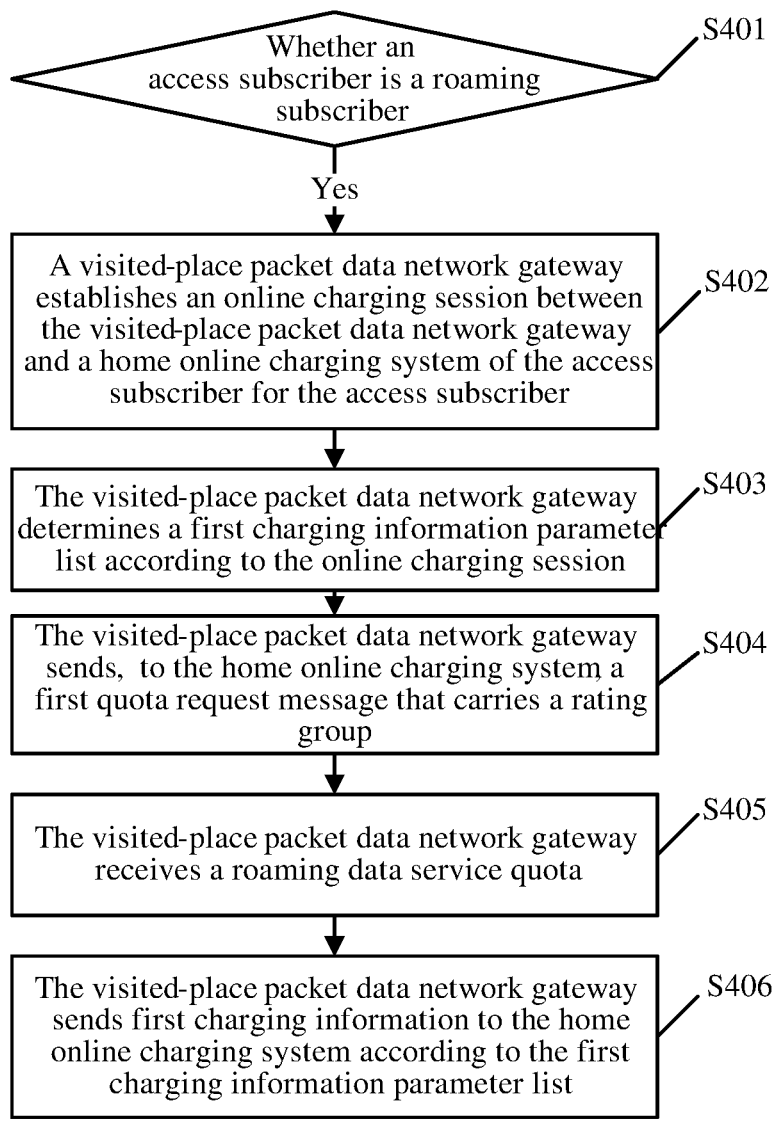
FIG. 4 is a schematic flowchart of a method for charging an inter-PLMN roaming data service online according to an embodiment of the present disclosure.

Referring to FIG. 4, FIG. 4 is a schematic flowchart of a method for charging an inter-PLMN roaming data service online according to an embodiment of the present disclosure. The method shown in FIG. 4 may be implemented by the packet data network gateway 200 shown in FIG. 2. As shown in FIG. 4, the method may include the following steps.

S401. A visited-place packet data network gateway determines whether an access subscriber is a roaming subscriber.

In this embodiment of the present disclosure, when a subscriber roams from a local PLMN to another PLMN, for a local PGW, the subscriber is a "roam-out" subscriber, and for a PGW on the another PLMN, the subscriber is an "roam-in" subscriber. Therefore, the determining, by the visited-place packet data network gateway, whether the access subscriber is a roaming subscriber is determining whether the access subscriber is a "roam-in" subscriber.

In an optional implementation manner, the determining, by a visited-place packet data network gateway, whether an access subscriber is a roaming subscriber may include determining whether a home public land mobile network identifier of the access subscriber is the same as a public land mobile network identifier of the visited-place packet data network gateway, where if no, it indicates that the access subscriber is a roaming subscriber, or if yes, it indicates that the access subscriber is not a roaming subscriber.

In this embodiment of the present disclosure, if a determining result indicates yes in step S401, perform step S402; or if a determining result indicates no in step S401, for the visited-place packet data network gateway, the access subscriber is a local subscriber, and the visited-place packet data network gateway establishes a local charging session for the access subscriber.

S402. The visited-place packet data network gateway establishes an online charging session between the visited-place packet data network gateway and a home online charging system of the access subscriber for the access subscriber.

In an optional implementation manner, the establishing, by the visited-place packet data network gateway, an online charging session between the visited-place packet data network gateway and a home online charging system of the access subscriber for the access subscriber may include sending, by the visited-place packet data network gateway, to a home online charging system that corresponds to an address of the home online charging system that is included in a PCC rule or a charging feature, a first request message that is used to establish the online charging session; and receiving, by the visited-place packet data network gateway, an online charging session response message that is sent by the home online charging system, and establishing the online charging session between the visited-place packet data network gateway and the home online charging system of the access subscriber for the access subscriber.

In this embodiment of the present disclosure, the PCC rule includes a PCC rule sent by a visited-place policy and charging rules function to the visited-place packet data network gateway. The charging feature includes a charging feature configured by default on a visited-place public land mobile network of the access subscriber. When the PCC rule includes the address of the home online charging system, the visited-place packet data network gateway sends, to a home online charging system that corresponds to the address of the home online charging system that is included in the PCC rule, the first request message that is used to establish the online charging session; or when the PCC rule does not include the address of the home online charging system, the visited-place packet data network gateway sends, to a home online charging system that corresponds to the address of the home online charging system that is included in the charging feature, the first request message that is used to establish the online charging session.

In this embodiment of the present disclosure, the online charging session is established when an IP-CAN session is established, and is interrupted when the IP-CAN session is interrupted, that is, a granularity of the online charging session is a session.

In another optional implementation manner, the establishing, by the visited-place packet data network gateway, an online charging session between the visited-place packet data network gateway and a home online charging system of the access subscriber for the access subscriber may include sending, by the visited-place packet data network gateway, to a proxy online charging system, a second request message that is used to establish a first charging session between the visited-place packet data network gateway and the proxy online charging system, where the proxy online charging system is a visited-place proxy online charging system of the access subscriber; and receiving, by the visited-place packet data network gateway, a first charging session response message sent by the proxy online charging system, and establishing the first charging session for the access subscriber.

In this embodiment of the present disclosure, the second request message is further used to trigger the proxy online charging system to determine whether a second charging session corresponding to the first charging session exists between the proxy online charging system and the determined home online charging system; and if a determining result indicates no, the proxy online charging system establishes a second charging session; or if a determining result indicates yes, the proxy online charging system stores a correspondence between the first charging session and a second charging session. Moreover, the second request message may include an address of the home online charging system, so that the proxy online charging system determines the home online charging system according to the address.

Optionally, the online charging session may include the first charging session and the second charging session. Moreover, the first charging session is established when an IP-CAN session is established, and is interrupted when the IP-CAN session is interrupted, that is, a granularity of the first charging session is a session. Alternatively, the first charging session is established when an IP-CAN bearer is established, and is interrupted when the IP-CAN bearer is interrupted, that is, a granularity of the first charging session is a bearer.

Optionally, the online charging session may include the first charging session, the second charging session, and at least one another charging session. The at least one another charging session is a session, in addition to the first charging session, that is between the visited-place packet data network gateway and the proxy online charging system and that has a correspondence with the second charging session. Moreover, the first charging session is established when an IP-CAN bearer is established, and is interrupted when the IP-CAN bearer is interrupted, that is, a granularity of the first charging session is a bearer.

S403. The visited-place packet data network gateway determines a first charging information parameter list according to the online charging session.

In this embodiment of the present disclosure, one or more charging information parameters applicable to a roaming subscriber and one or more charging information parameters applicable to a non-roaming subscriber are preconfigured for the visited-place packet data network gateway. In addition, the charging information parameters applicable to a roaming subscriber may be different from the charging information parameters applicable to a non-roaming subscriber.

In an optional implementation manner, the determining, by the visited-place packet data network gateway, a first charging information parameter list according to the online charging session may include determining, by the visited-place packet data network gateway, whether the online charging session is an inter-PLMN online charging session; and if a determining result indicates yes, forming, by the visited-place packet data network gateway, the first charging information parameter list using at least one charging information parameter applicable to a roaming subscriber; or if a determining result indicates no, forming, by the visited-place packet data network gateway, the first charging information parameter list using at least one charging information parameter applicable to a non-roaming subscriber, where the determining, by the visited-place packet data network gateway, whether the online charging session is an inter-PLMN online charging session may be determining, by the visited-place packet data network gateway, whether the online charging system and the visited-place packet data network gateway are on a same PLMN, where if the online charging system and the visited-place packet data network gateway are on different PLMNs, it is considered that the online charging session is an inter-PLMN online charging session.

In another optional implementation manner, the determining, by the visited-place packet data network gateway, a first charging information parameter list according to the online charging session may include determining that the online charging session is an online charging session established between the visited-place packet data network gateway and the home online charging system using the proxy online charging system, obtaining, by the visited-place packet data network gateway, a preconfigured charging information parameter applicable to a non-roaming subscriber, and forming the first charging information parameter list using the preconfigured charging information parameter applicable to a non-roaming subscriber.

S404. The visited-place packet data network gateway sends, to the home online charging system, a first quota request message that carries a rating group.

In this embodiment of the present disclosure, the first quota request message is used to request the home online charging system to return, according to the rating group, a roaming data service quota authorized by the home online charging system.

In an optional implementation manner, the sending, to the home online charging system by the visited-place packet data network gateway, a first quota request message that carries a rating group, to request the home online charging system to return, according to the rating group, a roaming data service quota authorized by the home online charging system may include directly sending, to the home online charging system by the visited-place packet data network gateway, the first quota request message that carries the rating group, to request the home online charging system to send, to the visited-place packet data network gateway in response to the first quota request message, the roaming data service quota of the rating group that is authorized by the home online charging system.

In another optional implementation manner, the sending, to the home online charging system by the visited-place packet data network gateway, a first quota request message that carries a rating group, to request the home online charging system to return, according to the rating group, a roaming data service quota authorized by the home online charging system may include sending, to the proxy online charging system by the visited-place packet data network gateway, the first quota request message that carries the rating group, to trigger the proxy online charging system to determine whether an available roaming data service quota of the rating group exists in the proxy online charging system, where if a determining result indicates yes, the proxy online charging system sends, to the visited-place packet data network gateway, the roaming data service quota allocated to the visited-place packet data network gateway, or if a determining result indicates no, the proxy online charging system sends, to the home online charging system, a second quota request message that carries the rating group, to request the home online charging system to send, to the proxy online charging system according to the rating group, the roaming data service quota authorized by the home online charging system, and then the proxy online charging system allocates a partial roaming data service quota from the roaming data service quota authorized by the home online charging system, and sends the allocated roaming data service quota to the visited-place packet data network gateway.

S405. The visited-place packet data network gateway receives a roaming data service quota.

In this embodiment of the present disclosure, the visited-place packet data network gateway receives the roaming data service quota of the rating group that is allocated by the home online charging system or the proxy online charging system in step S404.

S406. The visited-place packet data network gateway sends first charging information to the home online charging system according to the first charging information parameter list.

In this embodiment of the present disclosure, the first charging information includes a usage of the roaming data service quota.

In this embodiment of the present disclosure, when the visited-place packet data network gateway detects that a reporting condition satisfies a preset condition, the visited-place packet data network gateway sends the first charging information to the home online charging system. The preset condition includes that a location of the access subscriber changes, the roaming data service quota expires, the roaming data service quota is used up, or the like. This is not limited in this embodiment of the present disclosure.

In an optional implementation manner, the sending, by the visited-place packet data network gateway, first charging information to the home online charging system includes directly sending, by the visited-place packet data network gateway, the first charging information to the home online charging system.

In another optional implementation manner, the sending, by the visited-place packet data network gateway, first charging information to the home online charging system according to the first charging information parameter list when the access subscriber accesses a roaming data service includes sending, by the visited-place packet data network gateway, the first charging information to the proxy online charging system according to the first charging information parameter list, so that the proxy online charging system generates second charging information according to the first charging information and sends the second charging information to the home online charging system.

Implementation of this embodiment of the present disclosure can simplify a network connection between a visited-place PGW and an OCS of another operator that has a roaming agreement with the visited-place operator, reduce network connection complexity, and improve network connection efficiency and performance of controlling inter-PLMN subscriber consumption status online. In addition, use of a proxy online charging system to establish an online charging session can protect network topology security of a visited-place PLMN.

Figure 5:
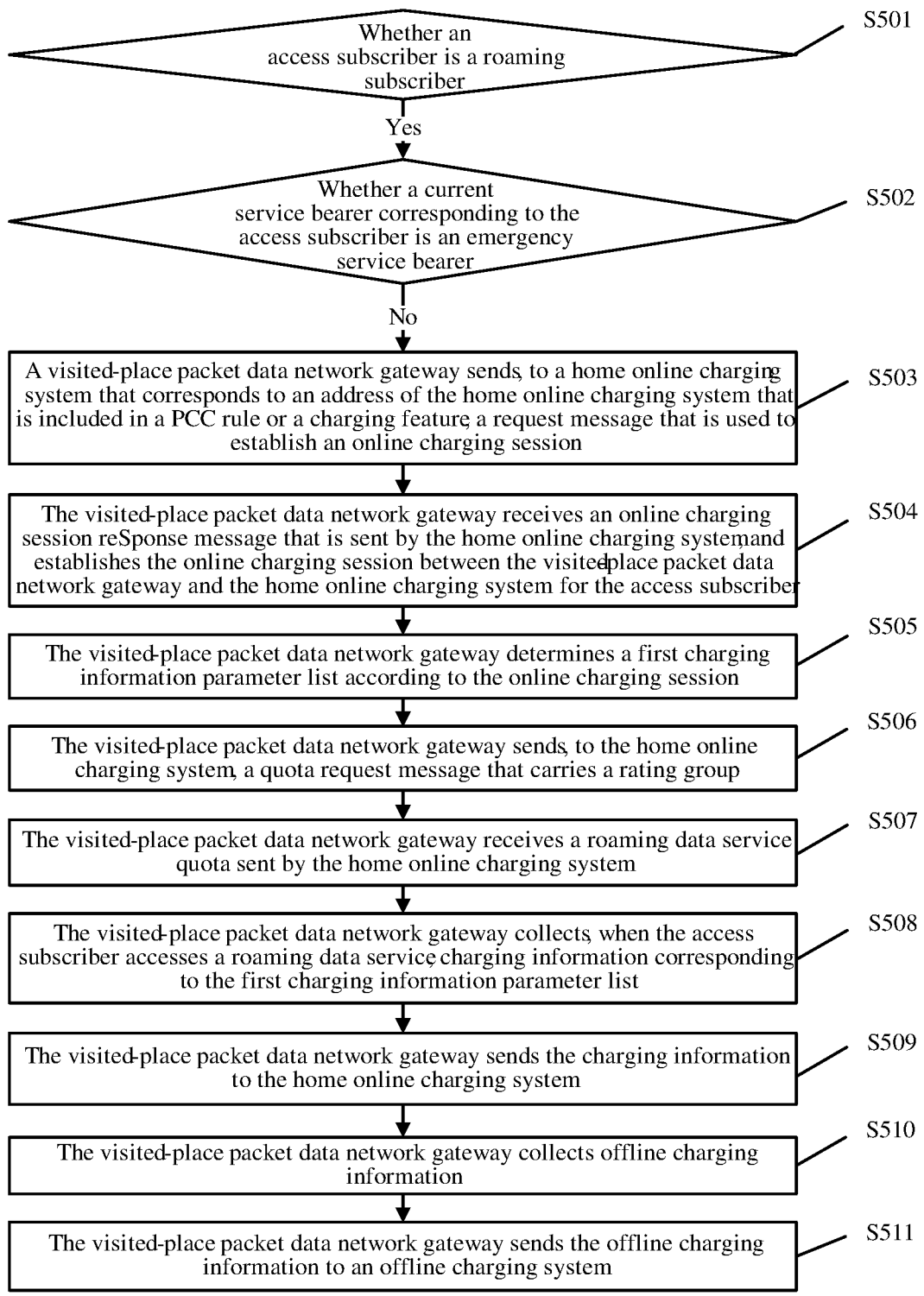
FIG. 5 is a schematic flowchart of another method for charging an inter-PLMN roaming data service online according to an embodiment of the present disclosure.

Referring to FIG. 5, FIG. 5 is a schematic flowchart of another method for charging an inter-PLMN roaming data service online according to an embodiment of the present disclosure. In this embodiment of the present disclosure, a visited-place packet data network gateway directly establishes an online charging session between the visited-place packet data network gateway and a home online charging system for a roaming subscriber. As shown in FIG. 5, the method may include the following steps.

S501. A visited-place packet data network gateway determines whether an access subscriber is a roaming subscriber.

In an optional implementation manner, the determining, by a visited-place packet data network gateway, whether an access subscriber is a roaming subscriber may include determining whether a home public land mobile network identifier of the access subscriber is the same as a public land mobile network identifier of the visited-place packet data network gateway, where if no, it indicates that the access subscriber is a roaming subscriber, or if yes, it indicates that the access subscriber is not a roaming subscriber.

In this embodiment of the present disclosure, if a determining result indicates yes in step S501, perform step S502; or if a determining result indicates no in step S501, for the visited-place packet data network gateway, the access subscriber is a local subscriber, and the visited-place packet data network gateway establishes a local charging session for the access subscriber.

S502. The visited-place packet data network gateway determines whether a current service bearer corresponding to the access subscriber is an emergency service bearer.

In this embodiment of the present disclosure, the visited-place packet data network gateway may determine, according to a PCC rule or an access point of the access subscriber, whether the current service bearer corresponding to the access subscriber is an emergency service bearer. This is not limited in this embodiment of the present disclosure.

In this embodiment of the present disclosure, if a determining result indicates no in step S502, perform step S503; or if a determining result indicates yes in step S502, the visited-place packet data network gateway does not establish an online charging session for the access subscriber, but instead, directly collects emergency call charging information for the access subscriber and performs recording using a Call Detail Record (CDR).

In this embodiment of the present disclosure, step S502 is an optional step.

S503. The visited-place packet data network gateway sends, to a home online charging system that corresponds to an address of the home online charging system that is included in a PCC rule or a charging feature, a request message that is used to establish an online charging session.

In this embodiment of the present disclosure, when the PCC rule includes the address of the home online charging system, the visited-place packet data network gateway sends, to a home online charging system that corresponds to the address of the home online charging system that is included in the PCC rule, the request message that is used to establish the online charging session; or when the PCC rule does not include the address of the home online charging system, the visited-place packet data network gateway sends, to a home online charging system that corresponds to the address of the home online charging system that is included in the charging feature, the request message that is used to establish the online charging session.

S504. The visited-place packet data network gateway receives an online charging session response message that is sent by the home online charging system, and establishes the online charging session between the visited-place packet data network gateway and the home online charging system for the access subscriber.

In this embodiment of the present disclosure, the online charging session is established when an IP-CAN session is established, and is interrupted when the IP-CAN session is interrupted, that is, a granularity of the online charging session is a session.

S505. The visited-place packet data network gateway determines a first charging information parameter list according to the online charging session.

In this embodiment of the present disclosure, one or more charging information parameters applicable to a roaming subscriber and one or more charging information parameters applicable to a non-roaming subscriber are preconfigured for the visited-place packet data network gateway. In addition, the charging information parameters applicable to a roaming subscriber may be different from the charging information parameters applicable to a non-roaming subscriber.

In an optional implementation manner, the determining, by the visited-place packet data network gateway, a first charging information parameter list according to the online charging session may include determining, by the visited-place packet data network gateway, whether the online charging session is an inter-PLMN online charging session; and if a determining result indicates yes, forming, by the visited-place packet data network gateway, the first charging information parameter list using at least one charging information parameter applicable to a roaming subscriber; or if a determining result indicates no, forming, by the visited-place packet data network gateway, the first charging information parameter list using at least one charging information parameter applicable to a non-roaming subscriber, where the determining, by the visited-place packet data network gateway, whether the online charging session is an inter-PLMN online charging session may be determining, by the visited-place packet data network gateway, whether the online charging system and the visited-place packet data network gateway are on a same PLMN, where if the online charging system and the visited-place packet data network gateway are on different PLMNs, it is considered that the online charging session is an inter-PLMN online charging session.

S506. The visited-place packet data network gateway sends, to the home online charging system, a quota request message that carries a rating group.

In this embodiment of the present disclosure, the quota request message triggers the home online charging system to send, to the visited-place packet data network gateway according to the rating group carried in the quota request message, a roaming data service quota authorized by the home online charging system.

S507. The visited-place packet data network gateway receives a roaming data service quota sent by the home online charging system.

S508. The visited-place packet data network gateway collects, when the access subscriber accesses a roaming data service, charging information corresponding to the first charging information parameter list.

In this embodiment of the present disclosure, the charging information includes a usage of the roaming data service quota in step S507.

S509. The visited-place packet data network gateway sends the charging information to the home online charging system.

In this embodiment of the present disclosure, when the visited-place packet data network gateway detects that a reporting condition satisfies a preset condition, the visited-place packet data network gateway sends the charging information to the home online charging system, so as to reduce reporting frequency of the visited-place packet data network gateway. The preset condition includes that a location of the access subscriber changes, the roaming data service quota expires, the roaming data service quota is used up, or the like. This is not limited in this embodiment of the present disclosure.

S510. The visited-place packet data network gateway collects offline charging information.

In this embodiment of the present disclosure, the offline charging information includes a usage of the roaming data service quota, so as to facilitate settlement of related accounts between a visited-place operator and a home operator. Moreover, the offline charging information includes indication information, and the indication information is used to indicate that the online charging session exists in a visited place of the access subscriber, to prevent the visited operator from repetitively charging the access subscriber.

S511. The visited packet data network gateway sends the offline charging information to an offline charging system.

In this embodiment of the present disclosure, the offline charging system is a visited-place offline charging system of the access subscriber.

In this embodiment of the present disclosure, when a reporting condition satisfies a preset condition, the visited-place packet data network gateway sends the offline charging information collected in step S510 to the offline charging system. Optionally, the visited-place packet data network gateway may directly send the offline charging information to the offline charging system according to an Accounting Request (ACR) command, or may first generate a CDR according to the offline charging information and then send the CDR to the offline charging system.

In this embodiment of the present disclosure, step S510 and step S511 are optional steps.

Implementation of this embodiment of the present disclosure can establish an online charging session between a visited-place packet data network gateway and a home online charging system for a roaming subscriber, simplify a network connection between a visited-place PGW and an OCS of another operator that has a roaming agreement with the visited-place operator, reduce network connection complexity, and improve network connection efficiency.

Figure 6:
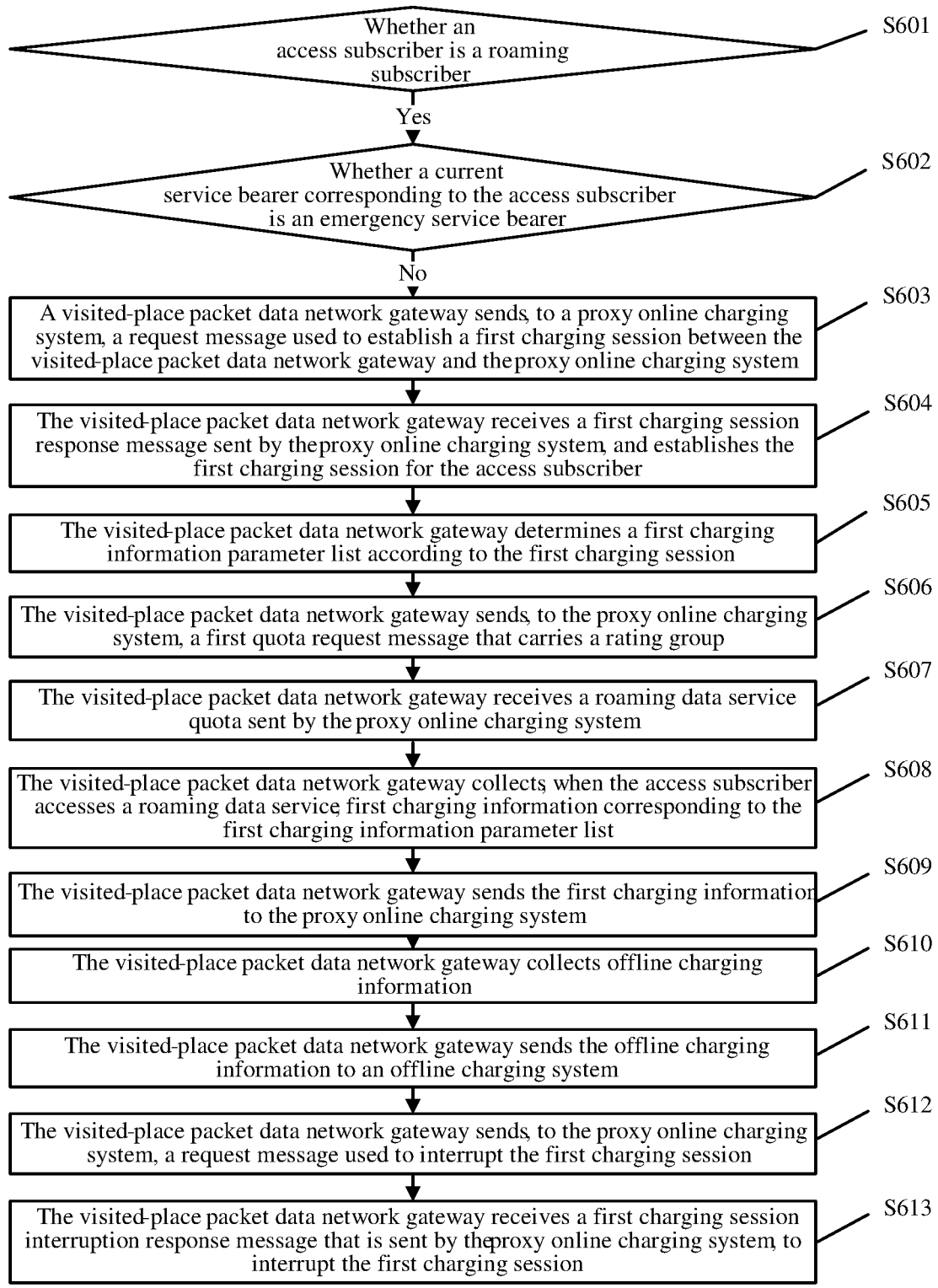
FIG. 6 is a schematic flowchart of still another method for charging an inter-PLMN roaming data service online according to an embodiment of the present disclosure.

Referring to FIG. 6, FIG. 6 is a schematic flowchart of still another method for charging an inter-PLMN roaming data service online according to an embodiment of the present disclosure. In this embodiment of the present disclosure, a visited-place packet data network gateway establishes a first charging session between the visited-place packet data network gateway and a proxy online charging system for a roaming subscriber, and the proxy online charging system establishes a second charging session between the proxy online charging system and a home online charging system for the roaming subscriber. As shown in FIG. 6, the method may include the following steps.

S601. A visited-place packet data network gateway determines whether an access subscriber is a roaming subscriber.

In this embodiment of the present disclosure, if a determining result indicates yes in step S601, perform step S602; or if a determining result indicates no in step S601, for the visited-place packet data network gateway, the access subscriber is a local subscriber, and the visited-place packet data network gateway establishes a local charging session for the access subscriber.

S602. The visited-place packet data network gateway determines whether a current service bearer corresponding to the access subscriber is an emergency service bearer.

In this embodiment of the present disclosure, if a determining result indicates no in step S602, perform step S603; or if a determining result indicates yes in step S602, the visited-place packet data network gateway does not establish an online charging session for the access subscriber, but instead, directly collects emergency call charging information for the access subscriber and performs recording using a CDR.

In this embodiment of the present disclosure, step S602 is optional.

S603. The visited-place packet data network gateway sends, to a proxy online charging system, a request message used to establish a first charging session between the visited-place packet data network gateway and the proxy online charging system.

In this embodiment of the present disclosure, the proxy online charging system is a visited-place proxy online charging system of the access subscriber.

In this embodiment of the present disclosure, the request message is further used to trigger the proxy online charging system to determine whether a second charging session corresponding to the first charging session exists between the proxy online charging system and the determined home online charging system; and if a determining result indicates no, the proxy online charging system establishes a second charging session; or if a determining result indicates yes, the proxy online charging system stores a correspondence between the first charging session and a second charging session. Moreover, the request message may include an address of the home online charging system, so that the proxy online charging system determines the home online charging system according to the address.

S604. The visited-place packet data network gateway receives a first charging session response message sent by the proxy online charging system, and establishes the first charging session for the access subscriber.

S605. The visited-place packet data network gateway determines a first charging information parameter list according to the first charging session.

The visited-place packet data network gateway obtains a preconfigured charging information parameter applicable to a non-roaming subscriber, and forms the first charging information parameter list using the preconfigured charging information parameter applicable to a non-roaming subscriber.

S606. The visited-place packet data network gateway sends, to the proxy online charging system, a first quota request message that carries a rating group.

In this embodiment of the present disclosure, the visited-place packet data network gateway sends, to the proxy online charging system, the first quota request message that carries the rating group, to trigger the proxy online charging system to determine whether an available roaming data service quota of the rating group exists in the proxy online charging system. If a determining result indicates yes, the proxy online charging system sends, to the visited-place packet data network gateway, the roaming data service quota allocated to the visited-place packet data network gateway. If a determining result indicates no, the proxy online charging system sends, to the home online charging system, a second quota request message that carries the rating group, to request the home online charging system to send, to the proxy online charging system according to the rating group, the roaming data service quota authorized by the home online charging system, and then the proxy online charging system allocates a partial roaming data service quota from the roaming data service quota authorized by the home online charging system, and sends the allocated roaming data service quota to the visited-place packet data network gateway.

S607. The visited-place packet data network gateway receives a roaming data service quota sent by the proxy online charging system.

S608. The visited-place packet data network gateway collects, when the access subscriber accesses a roaming data service, first charging information corresponding to the first charging information parameter list.

In this embodiment of the present disclosure, the first charging information includes a usage of the roaming data service quota in step S607.

S609. The visited-place packet data network gateway sends the first charging information to the proxy online charging system.

In this embodiment of the present disclosure, the visited-place packet data network gateway sends the first charging information to the proxy online charging system, and the proxy online charging system reduces, according to a preconfigured charging information parameter applicable to a roaming subscriber, the first charging information that is received from the visited-place packet data network gateway, to generate second charging information that is sent to the home online charging system and that includes the usage.

S610. The visited-place packet data network gateway collects offline charging information.

S611. The visited-place packet data network gateway sends the offline charging information to an offline charging system.

In this embodiment of the present disclosure, step S610 and step S611 are optional steps.

S612. The visited-place packet data network gateway sends, to the proxy online charging system, a request message used to interrupt the first charging session.

In this embodiment of the present disclosure, the request message is further used to trigger the proxy online charging system to determine whether the first charging session is a last charging session that has a correspondence with the second charging session, and if a determining result indicates yes, the proxy online charging system interrupts the second charging session.

S613. The visited-place packet data network gateway receives a first charging session interruption response message that is sent by the proxy online charging system, to interrupt the first charging session.

Implementation of this embodiment of the present disclosure enables a visited-place packet data network gateway to establish an online charging session for a roaming subscriber using a visited-place proxy online charging system. This protects a network topology of a visited-place PLMN, reduces reporting frequency of the visited-place packet data network gateway, simplifies network connection between the visited-place PLMN and a home PLMN, and improves performance of online control over a consumption status of a roaming subscriber by the visited-place packet data network gateway.

Figure 7:
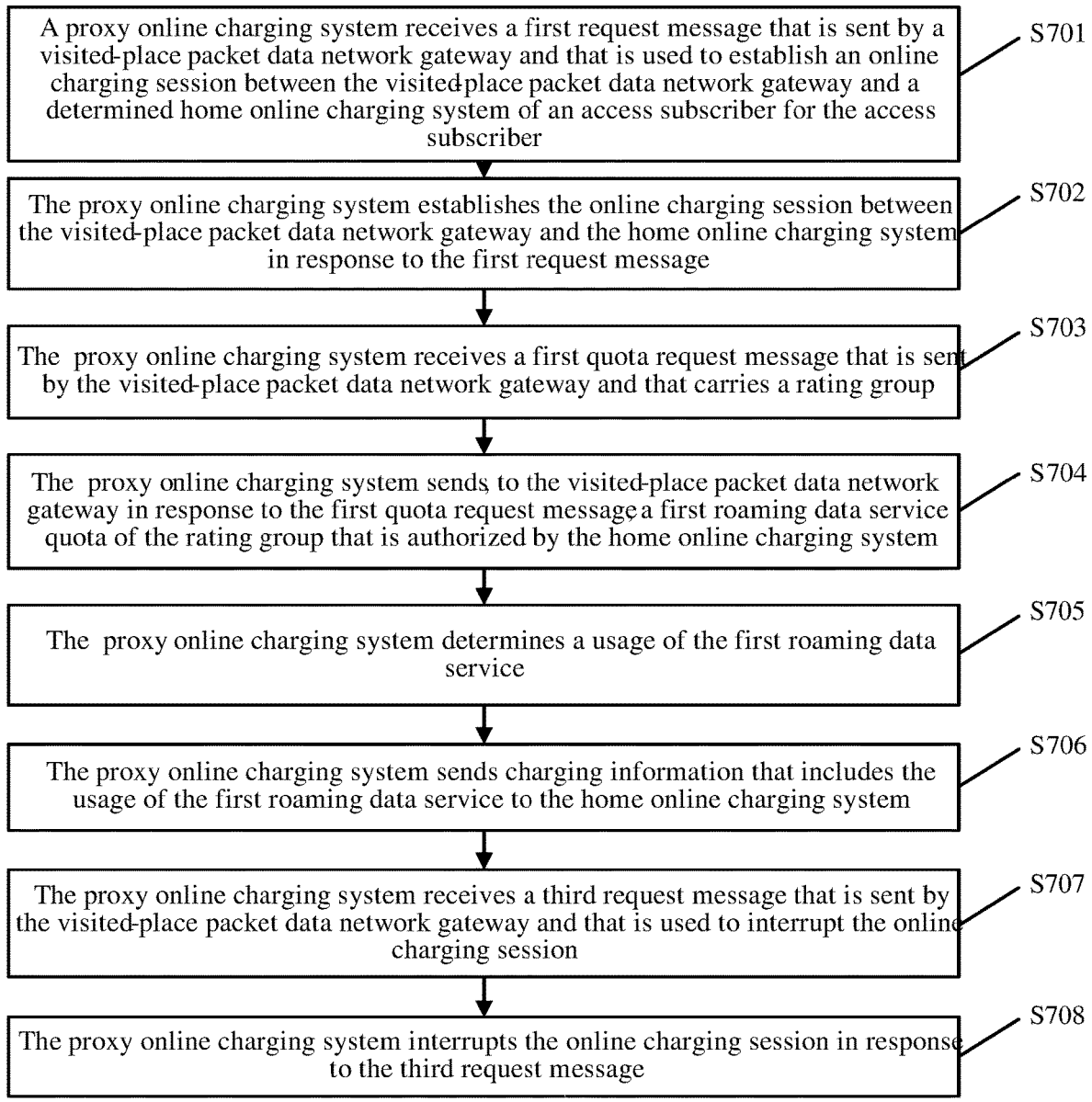
FIG. 7 is a schematic flowchart of yet another method for charging an inter-PLMN roaming data service online according to an embodiment of the present disclosure.

Referring to FIG. 7, FIG. 7 is a schematic flowchart of yet another method for charging an inter-PLMN roaming data service online according to an embodiment of the present disclosure. The method shown in FIG. 7 may be implemented by the proxy online charging system shown in FIG. 3. As shown in FIG. 7, the method may include the following steps.

S701. A proxy online charging system receives a first request message that is sent by a visited-place packet data network gateway and that is used to establish an online charging session between the visited-place packet data network gateway and a determined home online charging system of an access subscriber for the access subscriber.

In this embodiment of the present disclosure, the access subscriber is a roaming subscriber.

S702. The proxy online charging system establishes the online charging session between the visited-place packet data network gateway and the home online charging system in response to the first request message.

In an optional implementation manner, the establishing, by the proxy online charging system, the online charging session between the visited-place packet data network gateway and the home online charging system in response to the first request message may include establishing, by the proxy online charging system, a first charging session between the proxy online charging system and the visited-place packet data network gateway; determining, by the proxy online charging system according to the first request message, whether a second charging session corresponding to the first charging session exists between the proxy online charging system and the home online charging system; and if a determining result indicates no, establishing, by the proxy online charging system, a second charging session; or if a determining result indicates yes, storing, by the proxy online charging system, a correspondence between the first charging session and a second charging session; and responding, by the proxy online charging system, to the first request message.

In this embodiment of the present disclosure, the proxy online charging system may determine, using access subscriber identifiers or access subscriber internet protocol (IP) addresses of the first charging session and the second charging session that are stored in the proxy online charging system, whether the second charging session corresponding to the first charging session exists between the proxy online charging system and the home online charging system. That is, if the access subscriber identifier (or the access subscriber IP address) of the first charging session is the same as the access subscriber identifier (or the access subscriber IP address) of the second charging session, it indicates that the second charging session is a charging session corresponding to the first charging session. This is not limited in this embodiment of the present disclosure.

Optionally, the online charging session may include the first charging session and the second charging session. Moreover, the first charging session is established when an IP-CAN session is established, and is interrupted when the IP-CAN session is interrupted, that is, a granularity of the first charging session is a session. Alternatively, the first charging session is established when an IP-CAN bearer is established, and is interrupted when the IP-CAN bearer is interrupted, that is, a granularity of the first charging session is a bearer.

Optionally, the online charging session may include the first charging session, the second charging session, and at least one another charging session. The at least one another charging session is a session, in addition to the first charging session, that is between the visited-place packet data network gateway and the proxy online charging system and that has a correspondence with the second charging session.

Moreover, the first charging session is established when an IP-CAN bearer is established, and is interrupted when the IP-CAN bearer is interrupted, that is, a granularity of the first charging session is a bearer.

In this embodiment of the present disclosure, a granularity of the second charging session is a session.

S703. The proxy online charging system receives a first quota request message that is sent by the visited-place packet data network gateway and that carries a rating group.

S704. The proxy online charging system sends, to the visited-place packet data network gateway in response to the first quota request message, a first roaming data service quota of the rating group that is authorized by the home online charging system.

In an optional implementation manner, when a granularity of the first charging session is a session or a bearer, the sending, by the proxy online charging system to the visited-place packet data network gateway in response to the first quota request message, a first roaming data service quota of the rating group that is authorized by the home online charging system may include determining, by the proxy online charging system, whether the available first roaming data service quota of the rating group exists in the proxy online charging system; and if a determining result indicates yes, sending, by the proxy online charging system, the first roaming data service quota to the visited-place packet data network gateway; or if a determining result indicates no, sending, to the home online charging system by the proxy online charging system, a second quota request message that carries the rating group, to request the home online charging system to send, to the proxy online charging system according to the rating group, the first roaming data service quota authorized by the home online charging system; receiving, by the proxy online charging system, the first roaming data service quota authorized by the home online charging system; and sending, by the proxy online charging system, the first roaming data service quota to the visited-place packet data network gateway.

In this embodiment of the present disclosure, while the home online charging system sends the authorized first roaming data service quota to the proxy online charging system, the home online charging system may send an additional roaming data service quota whose rating group is the same as that of the first roaming data service quota to the proxy online charging system, and after receiving the additional roaming data service quota, the proxy online charging system stores the additional roaming data service quota, so that the proxy online charging system may directly allocate a required roaming data service quota from the stored additional roaming data service quota when the visited-place packet data network gateway applies for a roaming data service quota of the same rating group from the proxy online charging system next time, or directly send the additional roaming data service quota to the visited-place packet data network gateway. This is not limited in this embodiment of the present disclosure.

In another optional implementation manner, when a granularity of the first charging session is a bearer, the sending, by the proxy online charging system to the visited-place packet data network gateway in response to the first quota request message, a first roaming data service quota of the rating group that is authorized by the home online charging system may include determining, by the proxy online charging system, a first-type target charging session, which uses the roaming data service quota of the rating group, of multiple charging sessions, which correspond to the second charging session, between the proxy online charging system and the visited-place packet data network gateway, where the multiple charging sessions include the first charging session and the at least one another charging session; obtaining, by the proxy online charging system, a quota request message of each charging session of the first-type target charging session, and gathering a roaming data service quota of each charging session of the first-type target charging session to obtain a second roaming data service quota; sending, by the proxy online charging system, a second request message that is used to obtain the second roaming data service quota to the home online charging system, to request the home online charging system to send, to the proxy online charging system, a third roaming data service quota of the rating group that is authorized by the home online charging system; receiving, by the proxy online charging system, the third roaming data service quota, and allocating the first roaming data service quota from the third roaming data service quota; and sending, by the proxy online charging system, the first roaming data service quota to the visited-place packet data network gateway.

In still another optional implementation manner, when a granularity of the first charging session is a bearer, the sending, by the proxy online charging system to the visited-place packet data network gateway in response to the first quota request message, a first roaming data service quota of the rating group that is authorized by the home online charging system may include determining, by the proxy online charging system, a second-type target charging session, which uses the roaming data service quota of the rating group, of multiple charging sessions, which correspond to the second charging session, between the proxy online charging system and the visited-place packet data network gateway, where the multiple charging sessions include the first charging session and the at least one another charging session; obtaining, by the proxy online charging system, a usage of a roaming data service quota of each charging session of the second-type target charging session, to calculate a remaining roaming data service quota of each charging session of the second-type target charging session, and gathering the remaining roaming data service quota of each charging session of the second-type target charging session to obtain a fourth roaming data service quota; and allocating, by the proxy online charging system, the first roaming data service quota from the fourth roaming data service quota, and sending the first roaming data service quota to the visited-place packet data network gateway.

S705. The proxy online charging system determines a usage of the first roaming data service.

S706. The proxy online charging system sends charging information that includes the usage of the first roaming data service to the home online charging system.

In this embodiment of the present disclosure, the proxy online charging system reduces, according to a preconfigured charging information parameter applicable to a roaming subscriber, charging information that is received from the visited-place packet data network gateway, to generate the charging information that is sent to the home online charging system and that includes the usage of the first roaming data service quota.

S707. The proxy online charging system receives a third request message that is sent by the visited-place packet data network gateway and that is used to interrupt the online charging session.

S708. The proxy online charging system interrupts the online charging session in response to the third request message.

In an optional implementation manner, when a granularity of the first charging session is a bearer, the interrupting, by the proxy online charging system, the online charging session in response to the third request message may include interrupting the first charging session, determining whether the first charging session is the last charging session that has a correspondence with the second charging session, and if a determining result indicates yes, interrupting the second charging session.

In this embodiment of the present disclosure, after completing collection of the charging information, the visited-place packet data network gateway sends a request message used to interrupt the online charging session to the proxy online charging system, so as to reduce power consumption of the visited-place packet data network gateway and the proxy online charging system.

Implementation of this embodiment of the present disclosure enables a visited-place packet data network gateway to establish an online charging session for a roaming subscriber using a visited-place proxy online charging system. This protects a network topology of a visited-place PLMN, reduces reporting frequency of the visited-place packet data network gateway, simplifies network connection between the visited-place PLMN and a home PLMN, and improves performance of online control over a consumption status of a roaming subscriber by the visited-place packet data network gateway.

Figure 8:
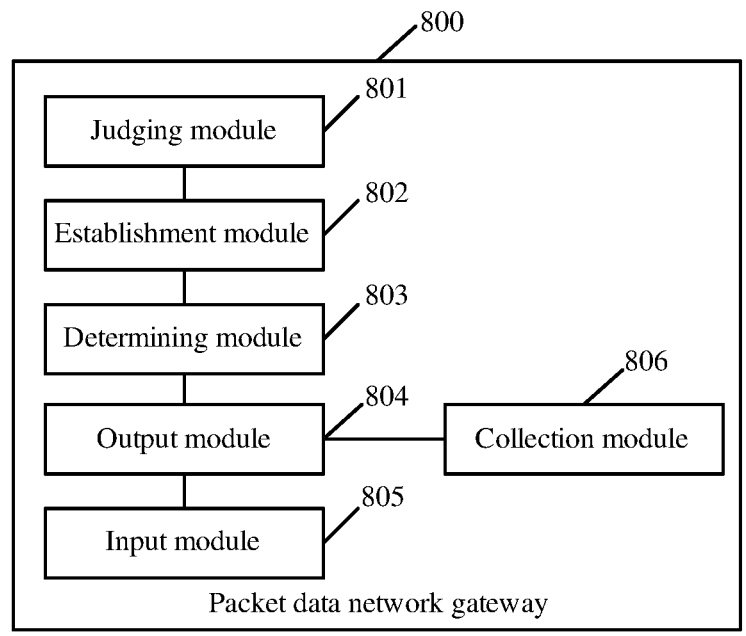
FIG. 8 is a schematic structural diagram of another packet data network gateway according to an embodiment of the present disclosure.

Referring to FIG. 8, FIG. 8 is a schematic structural diagram of another packet data network gateway according to an embodiment of the present disclosure. As shown in FIG. 8, the packet data network gateway 800 may include a judging module 801, an establishment module 802, a determining module 803, an output module 804, and an input module 805.

The judging module 801 is configured to determine whether an access subscriber is a roaming subscriber.

In an optional implementation manner, the judging module 801 may determine whether the access subscriber is a roaming subscriber in the following specific manner: determining whether a home public land mobile network identifier of the access subscriber is the same as a public land mobile network identifier of the packet data network gateway 800, where if no, it indicates that the access subscriber is a roaming subscriber, or if yes, it indicates that the access subscriber is not a roaming subscriber.

The establishment module 802 is configured to, when the judging module 801 determines that the access subscriber is a roaming subscriber, establish an online charging session between the packet data network gateway 800 and a home online charging system of the access subscriber for the access subscriber.

Figure 9:
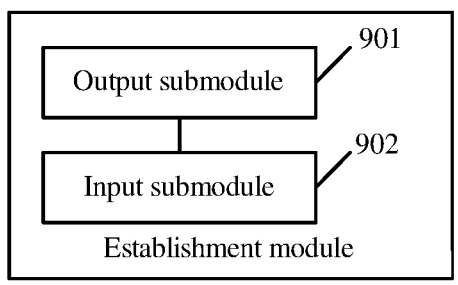
FIG. 9 is a schematic structural diagram of an establishment module in a packet data network gateway according to an embodiment of the present disclosure.

Optionally, a structure of the establishment module 802 may be shown in FIG. 9. FIG. 9 is a schematic structural diagram of an establishment module in a packet data network gateway according to an embodiment of the present disclosure. As shown in FIG. 9, the establishment module 802 may include an output submodule 901 and an input submodule 902.

In an optional implementation manner, the output submodule 901 may be configured to send, to a home online charging system that corresponds to an address of the home online charging system that is included in a PCC rule or a charging feature, a first request message that is used to establish the online charging session. The input submodule 902 may be configured to receive an online charging session response message that is sent by the home online charging system, and establish the online charging session between the packet data network gateway 800 and the home online charging system for the access subscriber. The online charging session is established when an IP-CAN session is established, and is interrupted when the IP-CAN session is interrupted, that is, a granularity of the online charging session is a session.

In another optional implementation manner, the output submodule 901 may be configured to send, to a proxy online charging system, a second request message that is used to establish a first charging session between the packet data network gateway 800 and the proxy online charging system; and the input submodule 902 may be configured to receive a first charging session response message sent by the proxy online charging system, and establish the first charging session for the access subscriber. The second request message is further used to trigger the proxy online charging system to determine whether a second charging session corresponding to the first charging session exists between the proxy online charging system and the determined home online charging system; and if a determining result indicates no, the proxy online charging system establishes a second charging session; or if a determining result indicates yes, the proxy online charging system stores a correspondence between the first charging session and a second charging session. Moreover, the second request message may include an address of the home online charging system, so that the proxy online charging system determines the home online charging system according to the address.

The determining module 803 is configured to determine a first charging information parameter list according to the online charging session.

In this embodiment of the present disclosure, one or more charging information parameters applicable to a roaming subscriber and one or more charging information parameters applicable to a non-roaming subscriber are preconfigured for the visited-place packet data network gateway. In addition, the charging information parameters applicable to a roaming subscriber may be different from the charging information parameters applicable to a non-roaming subscriber.

In an optional implementation manner, the determining module 803 may determine the first charging information parameter list according to the online charging session in the following specific manner: determining whether the online charging session is an inter-PLMN online charging session; and if a determining result indicates yes, forming, by the determining module 803, the first charging information parameter list using at least one charging information parameter applicable to a roaming subscriber; or if a determining result indicates no, forming, by the determining module 803, the first charging information parameter list using at least one charging information parameter applicable to a non-roaming subscriber, where the determining, by the determining module 803, whether the online charging session is an inter-PLMN online charging session may be determining whether the online charging system and the visited-place packet data network gateway are on a same PLMN, where if the online charging system and the visited-place packet data network gateway are on different PLMNs, it is considered that the online charging session is an inter-PLMN online charging session.

The output module 804 is configured to send, to the home online charging system, a first quota request message that carries a rating group, to request the home online charging system to return a roaming data service quota authorized by the home online charging system.

In an optional implementation manner, the output module 804 may send, to the home online charging system, the first quota request message that carries the rating group, to request the home online charging system to return, according to the rating group, the roaming data service quota authorized by the home online charging system in the following specific manner: sending, to the proxy online charging system, the first quota request message that carries the rating group, to trigger the proxy online charging system to determine whether an available roaming data service quota of the rating group exists in the proxy online charging system, where if a determining result indicates yes, the proxy online charging system sends, to the packet data network gateway 800, the roaming data service quota allocated to the packet data network gateway 800, or if a determining result indicates no, the proxy online charging system sends, to the home online charging system, a second quota request message that carries the rating group, to request the home online charging system to send, to the proxy online charging system, the roaming data service quota authorized by the home online charging system.

The input module 805 is configured to receive the roaming data service quota.

In this embodiment of the present disclosure, the input module 805 may receive the roaming data service quota of the rating group that is allocated by the home online charging system or the proxy online charging system.

The output module 804 is further configured to send first charging information to the home online charging system according to the first charging information parameter list.

In an optional implementation manner, the output module 804 may send the first charging information to the home online charging system according to the first charging information parameter list in the following specific manner: sending the first charging information to the proxy online charging system according to the first charging information parameter list, so that the proxy online charging system generates second charging information according to the first charging information and sends the second charging information to the home online charging system.

In an optional implementation manner, the output module 804 may be further configured to send a third request message that is used to interrupt the first charging session to the proxy online charging system. The input module 805 may be further configured to receive a first charging session interruption response message that is sent by the proxy online charging system, to interrupt the first charging session. The third request message is further used to trigger the proxy online charging system to determine whether the first charging session is a last charging session that has a correspondence with the second charging session, and if a determining result indicates yes, the proxy online charging system interrupts the second charging session.

In an optional implementation manner, the judging module 801 may be further configured to, when the access subscriber is a roaming subscriber, and before the establishment module 802 establishes the online charging session between the packet data network gateway 800 and the home online charging system for the access subscriber, determine whether a current service bearer corresponding to the access subscriber is an emergency service bearer; and if yes, the establishment module 802 does not establish the online charging session between the packet data network gateway 800 and the home online charging system for the access subscriber; or if no, the establishment module 802 establishes the online charging session between the packet data network gateway 800 and the home online charging system for the access subscriber.

In an optional implementation manner, the packet data network gateway 800 may further include a collection module 806.

The collection module 806 may be configured to collect offline charging information. The output module 804 may be further configured to send the offline charging information to an offline charging system. The offline charging system is a visited-place offline charging system of the access subscriber, the offline charging information facilitates settlement of related accounts between a visited-place operator and a home operator. The offline charging information includes indication information. The indication information is used to indicate that the online charging session exists in a visited place of the access subscriber, to prevent the visited-place operator from repetitively charging the access subscriber.

Implementation of this embodiment of the present disclosure can simplify a network connection between a visited-place PGW and an OCS of another operator that has a roaming agreement with the visited-place operator, reduce network connection complexity, and improve network connection efficiency and performance of controlling inter-PLMN subscriber consumption status online. In addition, use of a proxy online charging system to establish an online charging session can protect network topology security of a visited-place PLMN.

Figure 10:
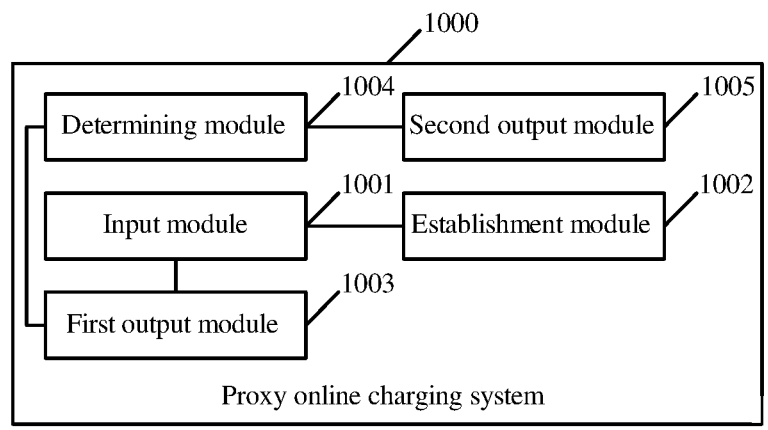
FIG. 10 is a schematic structural diagram of another proxy online charging system according to an embodiment of the present disclosure.

Referring to FIG. 10, FIG. 10 is a schematic structural diagram of another proxy online charging system according to an embodiment of the present disclosure. As shown in FIG. 10, the proxy online charging system 1000 may include an input module 1001, an establishment module 1002, a first output module 1003, a determining module 1004, and a second output module 1005.

The input module 1001 is configured to receive a first request message that is sent by a visited-place packet data network gateway and that is used to establish an online charging session between the visited-place packet data network gateway and a determined home online charging system for an access subscriber.

The establishment module 1002 is configured to establish the online charging session in response to the first request message.

Figure 12:
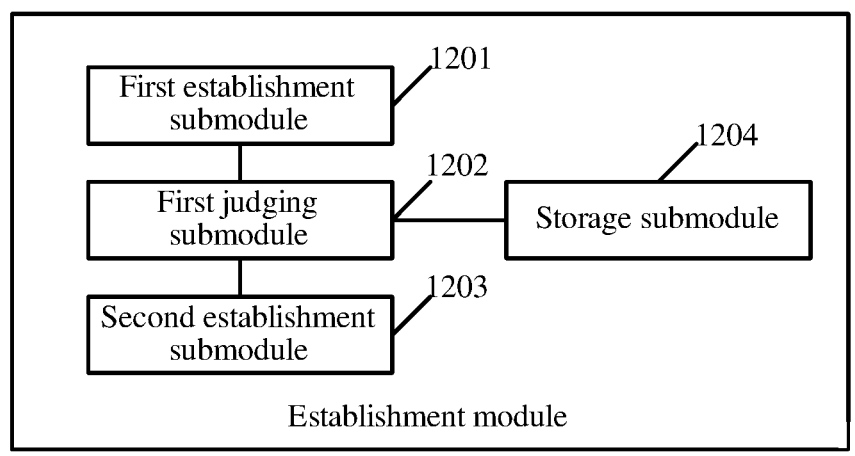
FIG. 12 is a schematic structural diagram of an establishment module in a proxy online charging system according to an embodiment of the present disclosure.

In an optional implementation manner, a structure of the establishment module 1002 may be shown in FIG. 12. FIG. 12 is a schematic structural diagram of an establishment module in a proxy online charging system according to an embodiment of the present disclosure. As shown in FIG. 12, the establishment module 1002 may include a first establishment submodule 1201, a first judging submodule 1202, a second establishment submodule 1203, and a storage submodule 1204.

The first establishment submodule 1201 is configured to establish a first charging session between the proxy online charging system 1000 and the visited-place packet data network gateway.

The first judging submodule 1202 is configured to determine, according to the first request message, whether a second charging session corresponding to the first charging session exists between the proxy online charging system 1000 and the home online charging system.

The second establishment submodule 1203 is configured to, when a determining result of the first judging submodule 1202 indicates no, establish a second charging session.

The storage submodule 1204 is configured to, when a determining result of the first judging submodule 1202 indicates yes, store a correspondence between the first charging session and a second charging session.

The input module 1001 is further configured to receive a first quota request message that is sent by the visited-place packet data network gateway and that carries a rating group.

The first output module 1003 is configured to send, to the visited-place packet data network gateway in response to the first quota request message, a first roaming data service quota of the rating group that is authorized by the home online charging system.

Figure 13:
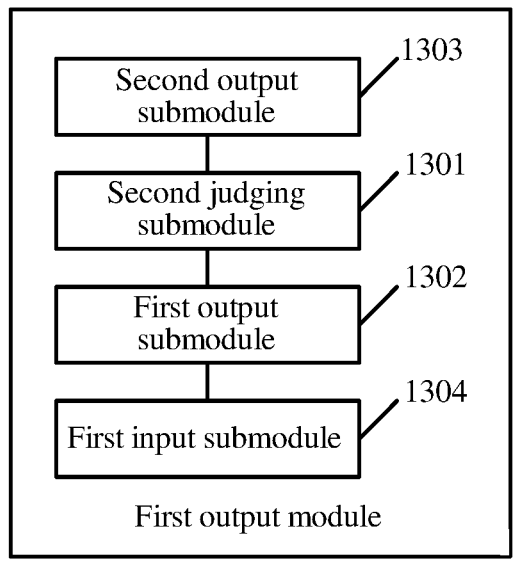
FIG. 13 is a schematic structural diagram of a first output module in a proxy online charging system according to an embodiment of the present disclosure.

In an optional implementation manner, a structure of the first output module 1003 may be shown in FIG. 13. FIG. 13 is a schematic structural diagram of a first output module in a proxy online charging system according to an embodiment of the present disclosure. As shown in FIG. 13, the first output module 1003 may include a second judging submodule 1301, a first output submodule 1302, a second output submodule 1303, and a first input submodule 1304.

The second judging submodule 1301 is configured to determine whether the first roaming data service quota of the rating group exists in the proxy online charging system 1000.

The first output submodule 1302 is configured to, when a determining result of the second judging submodule 1301 indicates yes, send the first roaming data service quota to the visited-place packet data network gateway.

The second output submodule 1303 is configured to, when a determining result of the second judging submodule 1301 indicates no, send, to the home online charging system, a second quota request message that carries the rating group, to request the home online charging system to send the first roaming data service quota to the proxy online charging system 1000 according to the rating group.

The first input submodule 1304 is configured to receive the first roaming data service quota.

The first output submodule 1302 may be further configured to send, to the visited-place packet data network gateway, the first roaming data service quota received from the home online charging system.

Figure 14:
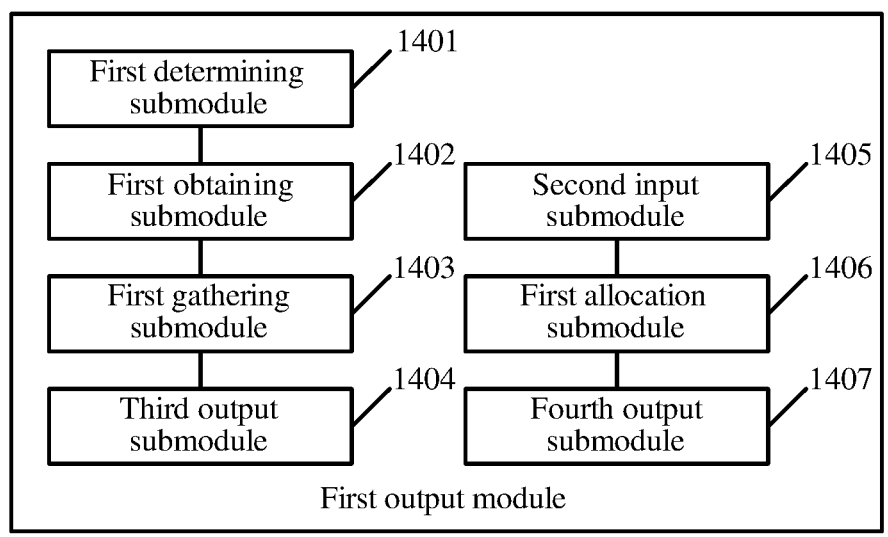
FIG. 14 is a schematic structural diagram of another first output module in a proxy online charging system according to an embodiment of the present disclosure.

In another optional implementation manner, a structure of the first output module 1003 may be shown in FIG. 14. FIG. 14 is a schematic structural diagram of another first output module in a proxy online charging system according to an embodiment of the present disclosure. As shown in FIG. 14, the first output module 1003 may include a first determining submodule 1401, a first obtaining submodule 1402, a first gathering submodule 1403, a third output submodule 1404, a second input submodule 1405, a first allocation submodule 1406, and a fourth output submodule 1407.

The first determining submodule 1401 is configured to determine a first-type target charging session, which uses the roaming data service quota of the rating group, of multiple charging sessions, which correspond to the second charging session, between the proxy online charging system 1000 and the visited-place packet data network gateway.

The first obtaining submodule 1402 is configured to obtain a quota request message of each charging session of the first-type target charging session.

The first gathering submodule 1403 is configured to gather a roaming data service quota of each charging session of the first-type target charging session to obtain a second roaming data service quota.

The third output submodule 1404 is configured to send a second request message that is used to obtain the second roaming data service quota to the home online charging system, to request the home online charging system to send, to the proxy online charging system 1000 in response to the second request message, a third roaming data service quota whose rating group is the same as that of the second roaming data service quota.

The second input submodule 1405 is configured to receive the third roaming data service quota.

The first allocation submodule 1406 is configured to allocate the first roaming data service quota from the third roaming data service quota.

The fourth output submodule 1407 is configured to send the first roaming data service quota to the visited-place packet data network gateway.

Figure 15:
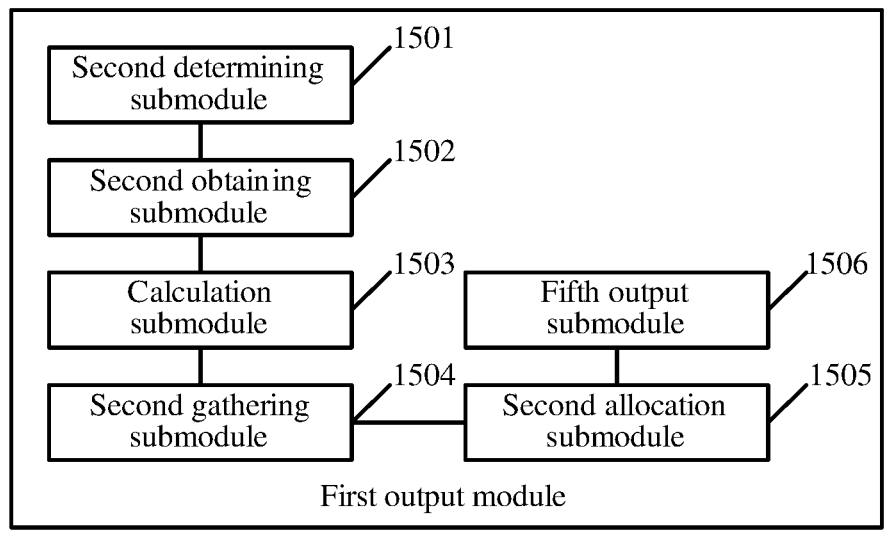
FIG. 15 is a schematic structural diagram of still another first output module in a proxy online charging system according to an embodiment of the present disclosure.

In still another optional implementation manner, a structure of the first output module 1003 may be shown in FIG. 15. FIG. 15 is a schematic structural diagram of still another first output module in a proxy online charging system according to an embodiment of the present disclosure. As shown in FIG. 15, the first output module 1003 may include a second determining submodule 1501, a second obtaining submodule 1502, a calculation submodule 1503, a second gathering submodule 1504, a second allocation submodule 1505, and a fifth output submodule 1506.

The second determining submodule 1501 is configured to determine a second-type target charging session, which uses the roaming data service quota of the rating group, of multiple charging sessions, which correspond to the second charging session, between the proxy online charging system 1000 and the visited-place packet data network gateway.

The second obtaining submodule 1502 is configured to obtain a usage of a roaming data service quota of each charging session of the second-type target charging session.

The calculation submodule 1503 is configured to calculate a remaining roaming data service quota of each charging session of the second-type target charging session.

The second gathering submodule 1504 is configured to gather the remaining roaming data service quota of each charging session of the second-type target charging session to obtain a fourth roaming data service quota.

The second allocation submodule 1505 is configured to allocate the first roaming data service quota from the fourth roaming data service quota.

The fifth output submodule 1506 is configured to send the first roaming data service quota to the visited-place packet data network gateway.

The determining module 1004 is configured to determine a usage of the first roaming data service quota.

The second output module 1005 is configured to send charging information that includes the usage to the home online charging system.

Implementation of this embodiment of the present disclosure enables a visited-place packet data network gateway to establish an online charging session for a roaming subscriber using a visited-place proxy online charging system. This protects a network topology of a visited-place PLMN, reduces reporting frequency of the visited-place packet data network gateway, simplifies network connection between the visited-place PLMN and a home PLMN, implements online control over a consumption status of a roaming subscriber by a home operator of the roaming subscriber, and improves performance of online control over a consumption status of a roaming subscriber by the visited-place packet data network gateway.

Figure 11:
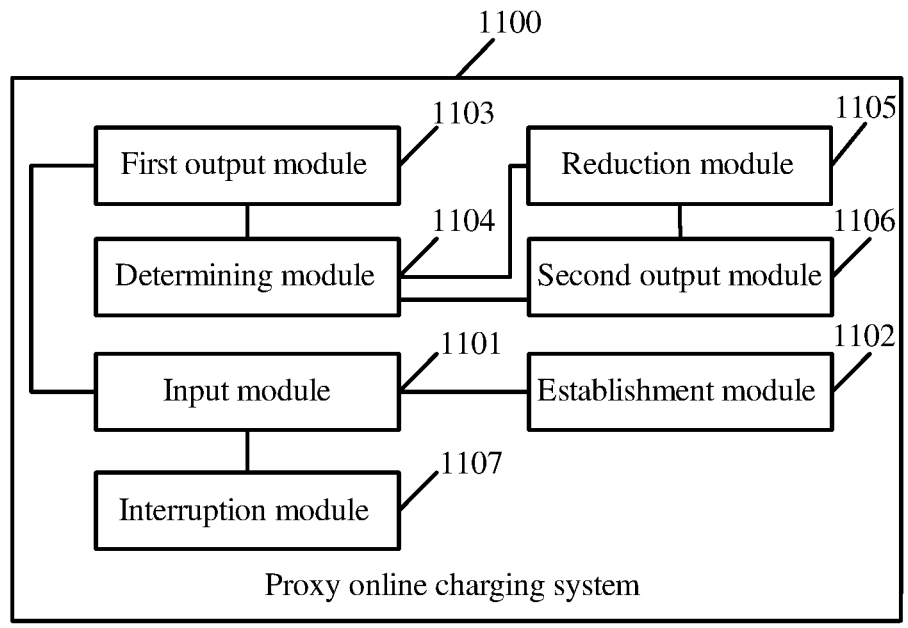
FIG. 11 is a schematic structural diagram of still another proxy online charging system according to an embodiment of the present disclosure.

Referring to FIG. 11, FIG. 11 is a schematic structural diagram of still another proxy online charging system according to an embodiment of the present disclosure. As shown in FIG. 11, the proxy online charging system 1100 may include an input module 1101, an establishment module 1102, a first output module 1103, a determining module 1104, a reduction module 1105, a second output module 1106, and an interruption module 1107.

The input module 1101 is configured to receive a first request message that is sent by a visited-place packet data network gateway and that is used to establish an online charging session between the visited-place packet data network gateway and a determined home online charging system for an access subscriber.

In this embodiment of the present disclosure, the first request message may include an address of the home online charging system, so that the proxy online charging system 1100 determines the home online charging system according to the address.

The establishment module 1102 is configured to establish the online charging session in response to the first request message.

In an optional implementation manner, a structure of the establishment module 1102 may be shown in FIG. 12. FIG. 12 is a schematic structural diagram of an establishment module in a proxy online charging system according to an embodiment of the present disclosure.

The input module 1101 is further configured to receive a first quota request message that is sent by the visited-place packet data network gateway and that carries a rating group.

The first output module 1103 is configured to send, to the visited-place packet data network gateway in response to the first quota request message, a first roaming data service quota of the rating group that is authorized by the home online charging system.

In an optional implementation manner, the first output module 1103 may be shown in FIG. 13. FIG. 13 is a schematic structural diagram of a first output module in a proxy online charging system according to an embodiment of the present disclosure.

In another optional implementation manner, the first output module 1103 may be shown in FIG. 14. FIG. 14 is a schematic structural diagram of another first output module in a proxy online charging system according to an embodiment of the present disclosure.

In still another optional implementation manner, the first output module 1103 may be shown in FIG. 15. FIG. 15 is a schematic structural diagram of still another first output module in a proxy online charging system according to an embodiment of the present disclosure.

The determining module 1104 is configured to determine a usage of the first roaming data service quota.

The reduction module 1105 is configured to reduce, according to a preconfigured charging information parameter applicable to a roaming subscriber, charging information that is received from the visited-place packet data network gateway, to generate charging information that is sent to the home online charging system. The charging information that is sent to the home online charging system includes the usage of the roaming data service quota.

The second output module 1106 is configured to send the charging information that includes the usage to the home online charging system.

The input module 1101 is further configured to receive a third request message that is sent by the visited-place packet data network gateway and that is used to interrupt the online charging session.

The interruption module 1107 is configured to interrupt the online charging session in response to the third request message.

Figure 16:
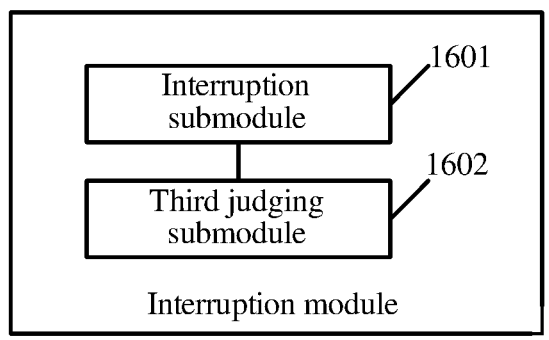
FIG. 16 is a schematic structural diagram of an interruption module in a proxy online charging system according to an embodiment of the present disclosure.

In an optional implementation manner, a structure of the interruption module 1107 may be shown in FIG. 16. FIG. 16 is a schematic structural diagram of an interruption module in a proxy online charging system according to an embodiment of the present disclosure. As shown in FIG. 16, the interruption module 1106 may include an interruption submodule 1601 and a third judging submodule 1602.

The interruption submodule 1601 is configured to interrupt a first charging session.

The third judging submodule 1602 is configured to determine whether the first charging session is a last charging session that has a correspondence with a second charging session.

The interruption submodule 1601 is further configured to, when a determining result of the third judging submodule 1602 indicates yes, interrupt the second charging session.

In this embodiment of the present disclosure, after completing collection of the charging information, the visited-place packet data network gateway sends a request message used to interrupt the online charging session to the proxy online charging system, so as to reduce power consumption of the visited-place packet data network gateway and the proxy online charging system.

Implementation of this embodiment of the present disclosure enables a visited-place packet data network gateway to establish an online charging session for a roaming subscriber using a visited-place proxy online charging system. This protects a network topology of a visited-place PLMN, reduces reporting frequency of the visited-place packet data network gateway, simplifies network connection between the visited-place PLMN and a home PLMN, implements online control over a consumption status of a roaming subscriber by a home operator of the roaming subscriber, and improves performance of online control over a consumption status of a roaming subscriber by the visited-place packet data network gateway.

It should be noted that, in the foregoing embodiments, descriptions of the embodiments have different emphases. For any part that is not described in detail in an embodiment, refer to a related description in another embodiment. In addition, a person skilled in the art should also know that the embodiments described in this specification are all examples of embodiments, and actions, modules, and submodules involved are not necessarily mandatory in the present disclosure.

Steps in the method of the embodiments of the present disclosure may be adjusted in terms of a sequence, combined, or deleted according to an actual requirement.

Modules and submodules in the apparatus of the embodiments of the present disclosure may be combined, divided, or deleted according to an actual requirement.

The modules and submodules in the embodiments of the present disclosure may be implemented using a universal integrated circuit such as a CPU, or using an Application Specific Integrated Circuit (ASIC).

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a Read-Only Memory (ROM), or a RAM.

A method for charging an inter-PLMN roaming data service online, and a device provided in the embodiments of the present disclosure are described in detail above. Although the principles and implementation manners of the present disclosure are described using specific examples in this specification, the descriptions of the embodiments are merely intended to help understand the method and core ideas of the present disclosure. In addition, a person of ordinary skill in the art may make modifications to the specific implementation manners and application scopes according to the ideas of the present disclosure. In conclusion, the content of the specification should not be construed as a limitation on the present disclosure.

What is claimed is:

1. A method for charging an inter-Public Land Mobile Network (PLMN) roaming data service online, comprising:
    establishing for a roaming subscriber, by a visited-place packet data network gateway through a first Gy interface between the visited-place packet data network gateway in a visited-place network architecture and a home online charging function in a home network architecture, an online charging session between the visited-place packet data network gateway and the home online charging function for the roaming subscriber, wherein the first Gy interface is different than a second Gy interface between a visited online charging function in the visited-place network architecture and the visited-place packet data network gateway, and wherein establishing the online charging session comprises:
        sending, based on an address of the home online charging function and through the first Gy interface, a first request message from the visited-place packet data network gateway to the home online charging function of the roaming subscriber, wherein the address of the home online charging function is obtained by the visited-place packet data network gateway in the visited-place network architecture from a visited-policy and charging rules function that is distinct from the visited-place packet data network gateway; and
        receiving, by the visited-place packet data network gateway, an online charging session response message from the home online charging function;
    determining, by the visited-place packet data network gateway, a charging information parameter applicable to the roaming subscriber;
    sending, by the visited-place packet data network gateway to the home online charging function, a first quota request message that carries a rating group;
    receiving, by the visited-place packet data network gateway, a roaming data service quota from the home online charging function according to the rating group; and
    sending, by the visited-place packet data network gateway, first charging information to the home online charging function according to the charging information parameter, wherein the first charging information comprises a usage of the roaming data service quota.

2. The method of claim 1, wherein the method further comprises determining, by the visited-place packet data network gateway, whether a subscriber is the roaming subscriber.

3. The method of claim 2, wherein the method further comprises determining that the subscriber is the roaming subscriber when a home public land mobile network identifier of the subscriber is different than a public land mobile network identifier of the visited-place packet data network gateway.

4. The method of claim 1, wherein the online charging session is established when an Internet Protocol-connectivity access network (IP-CAN) session is established, and wherein the online charging session is interrupted when the IP-CAN session is interrupted.

5. A visited-place packet data network gateway, comprising:
    a processor; and
    a computer-readable storage medium coupled to the processor and configured to store programming instructions for execution by the processor such that when executed, cause the visited-place packet data network gateway to:
        establish for a roaming subscriber, through a first Gy interface between the visited-place packet data network gateway in a visited-place network architecture and a home online charging function in a home network architecture, an online charging session between the visited-place packet data network gateway and the home online charging function, wherein the first Gy interface is different than a second Gy interface between a visited online charging function in the visited-place network architecture and the visited-place packet data network gateway, and wherein the visited-place packet data network gateway is configured to establish the online charging session by:
            sending, based on an address of the home online charging function and through the first Gy interface, a first request message to the home online charging function of the roaming subscriber, wherein the address of the home online charging function is obtained by the visited-place packet data network gateway in the visited-place network architecture from a visited-policy and charging rules function; and
            receiving an online charging session response message from the home online charging function;
        determine a charging information parameter applicable to the roaming subscriber;
        send, to the home online charging function, a first quota request message carrying a rating group;
        receive a roaming data service quota from the home online charging function according to the rating group; and
        send first charging information to the home online charging function according to the charging information parameter, wherein the first charging information comprises a usage of the roaming data service quota.

6. The visited-place packet data network gateway of claim 5, wherein when the programming instructions are executed by the processor, the visited-place packet data network gateway is further configured to determine whether a subscriber is the roaming subscriber.

7. The visited-place packet data network gateway of claim 6, wherein when the programming instructions are executed by the processor, the visited-place packet data network gateway is further configured to determine that the subscriber is the roaming subscriber when a home public land mobile network identifier of the subscriber is different than a public land mobile network identifier of the visited-place packet data network gateway.

8. The visited-place packet data network gateway of claim 5, wherein the online charging session is established when an Internet Protocol-connectivity access network (IP-CAN) session is established, and wherein the online charging session is interrupted when the IP-CAN session is interrupted.

9. A visited-place packet data network gateway, comprising:
- a memory; and
- a processor coupled to the memory and configured to:
  - establish for a roaming subscriber, through a first Gy interface between the visited-place packet data network gateway in a visited-place network architecture and a home online charging function in a home network architecture, an online charging session between the visited-place packet data network gateway and the home online charging function for the roaming subscriber, wherein the first Gy interface is different than a second Gy interface between a visited online charging function in the visited-place network architecture and the visited-place packet data network gateway, and wherein the visited-place packet data network gateway is configured to establish the online charging session by:
    - sending, based on an address of the home online charging function and through the first Gy interface, a first request message to the home online charging function of the roaming subscriber, wherein the address of the home online charging function is obtained by the visited-place packet data network gateway in the visited-place network architecture from a visited-policy and charging rules function; and
    - receiving an online charging session response message from the home online charging function;
  - determine a charging information parameter applicable to the roaming subscriber;
  - send, to the home online charging function, a first quota request message carrying a rating group;
  - receive a roaming data service quota from the home online charging function according to the rating group; and
  - send first charging information to the home online charging function according to the charging information parameter, wherein the first charging information comprises a usage of the roaming data service quota.

10. The visited-place packet data network gateway of claim 9, wherein the processor is further configured to determine whether a subscriber is the roaming subscriber.

11. The visited-place packet data network gateway of claim 10, wherein the processor is further configured to determine that the subscriber is the roaming subscriber when a home public land mobile network identifier of the subscriber is different than a public land mobile network identifier of the visited-place packet data network gateway.

12. The visited-place packet data network gateway of claim 9, wherein the online charging session is established when an Internet Protocol-connectivity access network (IP-CAN) session is established, and wherein the online charging session is interrupted when the IP-CAN session is interrupted.

13. A system for charging an inter-Public Land Mobile Network (PLMN) roaming data service online, comprising:
- a home online charging function for a roaming subscriber; and
- a visited-place packet data network gateway communicatively coupled to the home online charging function and comprising:
  - a processor; and
  - a computer-readable storage medium coupled to the processor and configured to store programming instructions that, when executed by the processor, cause the visited-place packet data network gateway to:
    - establish for the roaming subscriber, through a first Gy interface between the visited-place packet data network gateway in a visited-place network architecture and the home online charging function in a home network architecture, an online charging session between the visited-place packet data network gateway and the home online charging function, wherein the first Gy interface is different than a second Gy interface between a visited online charging function in the visited-place network architecture and the visited-place packet data network gateway, and wherein the visited-place packet data network gateway is configured to establish the online charging session by:
      - sending, based on an address of the home online charging function and through the first Gy interface, a first request message to the home online charging function of the roaming subscriber, wherein the address of the home online charging function is obtained by the visited-place packet data network gateway in the visited-place network architecture from a visited-policy and charging rules function; and
      - receiving an online charging session response message from the home online charging function;
    - send a first quota request message to the home online charging function, wherein the first quota request message carries a rating group;
    - receive a roaming data service quota from the home online charging function according to the rating group; and
    - send first charging information to the home online charging function according to a charging information parameter applicable to the roaming subscriber, wherein the first charging information comprises a usage of the roaming data service quota, and
  - wherein the home online charging function is configured to:
    - receive the first request message;
    - send the online charging session response message;
    - receive the first quota request message;
    - send the roaming data service quota according to the rating group; and
    - receive the first charging information.

14. The system of claim 13, wherein before sending, by the visited-place packet data network gateway, the first request message, the visited-place packet data network gateway is further configured to determine whether a subscriber is the roaming subscriber.

15. The system of claim 14, wherein the visited-place packet data network gateway is further configured to determine that the subscriber is the roaming subscriber when a home public land mobile network identifier of the subscriber is different than a public land mobile network identifier of the visited-place packet data network gateway.

16. The system of claim 13, wherein the online charging session is established when an Internet Protocol-connectivity access network (IP-CAN) session is established, and wherein the online charging session is interrupted when the IP-CAN session is interrupted.

17. A system for charging an inter-Public Land Mobile Network (PLMN) roaming data service online, comprising:

a home online charging function for a roaming subscriber; and a visited-place packet data network gateway coupled to the home online charging function and configured to:
- establish for the roaming subscriber, through a first Gy interface between the visited-place packet data network gateway in a visited-place network architecture and the home online charging function in a home network architecture, an online charging session between the visited-place packet data network gateway and the home online charging function, wherein the first Gy interface is different than a second Gy interface between a visited online charging function in the visited-place network architecture and the visited-place packet data network gateway, wherein the visited-place packet data network gateway is configured to establish the online charging session by:
  - sending, based on an address of the home online charging function and through the first Gy interface, a first request message to the home online charging function of the roaming subscriber, wherein the address of the home online charging function is obtained by the visited-place packet data network gateway in the visited-place network architecture from a visited-policy and charging rules function; and
  - receiving an online charging session response message from the home online charging function;
- send to the home online charging function, a first quota request message that carries a rating group;
- receive a roaming data service quota from the home online charging function according to the rating group; and
- send first charging information to the home online charging function according to a charging information parameter applicable to the roaming subscriber, wherein the first charging information comprises a usage of the roaming data service quota, and wherein the home online charging function is configured to:
- receive the first request message;
- send the online charging session response message;
- receive the first quota request message;
- send the roaming data service quota according to the rating group; and
- receive the first charging information.

18. The method of claim 2, wherein the online charging session is established when the subscriber is determined to be the roaming subscriber.

19. The visited-place packet data network gateway of claim 6, wherein the programming instructions are further configured to cause the visited-place packet data network gateway to establish the online charging session when the subscriber is the roaming subscriber.

20. The visited-place packet data network gateway of claim 10, wherein the processor is configured to establish the online charging session when the subscriber is the roaming subscriber.

* * * * *